US007646962B1

(12) United States Patent
Ellis et al.

(10) Patent No.: US 7,646,962 B1
(45) Date of Patent: Jan. 12, 2010

(54) SYSTEM AND METHODS FOR RECORDING AND PLAYING BACK PROGRAMS HAVING DESIRABLE RECORDING ATTRIBUTES

(75) Inventors: Michael D. Ellis, Boulder, CO (US); Reed S. Spiegel, Jr., Berwyn, PA (US)

(73) Assignee: GuideWorks, LLC, Radnor, PA (US)

( * ) Notice: Subject to any disclaimer, the term of this patent is extended or adjusted under 35 U.S.C. 154(b) by 721 days.

(21) Appl. No.: 11/241,523

(22) Filed: Sep. 30, 2005

(51) Int. Cl.
*H04N 5/91* (2006.01)
*H04N 7/08* (2006.01)
(52) U.S. Cl. .......................................... 386/83; 386/92
(58) Field of Classification Search .................. 386/83, 386/46, 124, 125, 92
See application file for complete search history.

(56) References Cited

U.S. PATENT DOCUMENTS

| | | |
|---|---|---|
| 4,355,415 A | 10/1982 | George et al. |
| 4,605,964 A | 8/1986 | Chard |
| 4,694,490 A | 9/1987 | Harvey et al. |
| 4,706,121 A | 11/1987 | Young |
| 4,718,107 A | 1/1988 | Hayes |
| 4,847,698 A | 7/1989 | Freeman |
| 4,857,999 A | 8/1989 | Welsh |
| 4,908,707 A | 3/1990 | Kinghorn |
| 4,930,158 A | 5/1990 | Vogel |
| 4,959,720 A | 9/1990 | Duffield et al. |
| 4,977,455 A | 12/1990 | Young |
| 5,047,867 A | 9/1991 | Strubbe et al. |
| 5,109,279 A | 4/1992 | Ando |
| 5,134,719 A | 7/1992 | Mankovitz |
| 5,151,789 A | 9/1992 | Young |
| 5,172,413 A | 12/1992 | Bradley et al. |
| 5,200,822 A | 4/1993 | Bronfin et al. |
| 5,223,924 A | 6/1993 | Strubbe |
| 5,253,066 A | 10/1993 | Vogel |
| 5,335,277 A | 8/1994 | Harvey et al. |
| 5,353,121 A | 10/1994 | Young et al. |
| 5,412,720 A | 5/1995 | Hoarty |
| 5,442,389 A | 8/1995 | Blahut et al. |

(Continued)

FOREIGN PATENT DOCUMENTS

EP   0424469   5/1991

(Continued)

OTHER PUBLICATIONS

U.S. Appl. No. 11/097,566, filed Apr. 1, 2005, Ellis et al.

(Continued)

*Primary Examiner*—Robert Chevalier
(74) *Attorney, Agent, or Firm*—Ropes & Gray LLP; Baaba Andam; Brian E. Mack

(57) ABSTRACT

Systems and methods for recording multiple copies of a program are provided. The method may include receiving a user instruction to record a program. A determination may be made to record multiple copies of the program. In response to the determination, multiple copies of the program may be recorded. A user instruction to display the recorded program may be received. A copy of the program may be played back. The user may switch to another copy of the recorded program if the original copy lacks desirable recording attributes, or the interactive television application may automatically switch to another copy of the program.

29 Claims, 14 Drawing Sheets

U.S. PATENT DOCUMENTS

| | | | |
|---|---|---|---|
| 5,461,415 A | 10/1995 | Wolf et al. | |
| 5,479,266 A | 12/1995 | Young et al. | |
| 5,479,268 A | 12/1995 | Young et al. | |
| 5,483,278 A | 1/1996 | Strubbe et al. | |
| 5,485,197 A | 1/1996 | Hoarty | |
| 5,488,409 A | 1/1996 | Yuen et al. | |
| 5,517,257 A | 5/1996 | Dunn et al. | |
| 5,523,794 A | 6/1996 | Mankovitz et al. | |
| 5,523,796 A | 6/1996 | Marshall et al. | |
| 5,524,195 A | 6/1996 | Clanton, III et al. | |
| 5,532,754 A | 7/1996 | Young et al. | |
| 5,534,911 A | 7/1996 | Levitan | |
| 5,537,141 A | 7/1996 | Harper et al. | |
| 5,539,449 A | 7/1996 | Blahut et al. | |
| 5,541,738 A | 7/1996 | Mankovitz | |
| 5,543,852 A | 8/1996 | Yuen et al. | |
| 5,550,576 A | 8/1996 | Klosterman | |
| 5,581,614 A | 12/1996 | Ng et al. | |
| 5,583,561 A | 12/1996 | Baker et al. | |
| 5,583,563 A | 12/1996 | Wanderscheid et al. | |
| 5,585,838 A | 12/1996 | Lawler et al. | |
| 5,585,858 A | 12/1996 | Harper et al. | |
| 5,585,866 A | 12/1996 | Miller et al. | |
| 5,589,892 A | 12/1996 | Knee et al. | |
| 5,592,551 A | 1/1997 | Lett et al. | |
| 5,602,582 A | 2/1997 | Wanderscheid et al. | |
| 5,619,274 A | 4/1997 | Roop et al. | |
| 5,621,579 A | 4/1997 | Yuen | |
| 5,630,119 A | 5/1997 | Aristides et al. | |
| 5,632,007 A | 5/1997 | Freeman | |
| 5,648,824 A | 7/1997 | Dunn et al. | |
| 5,652,613 A | 7/1997 | Lazarus et al. | |
| 5,654,748 A | 8/1997 | Matthews, III | |
| 5,654,886 A | 8/1997 | Zereski, Jr. et al. | |
| 5,657,072 A | 8/1997 | Aristides et al. | |
| 5,659,367 A | 8/1997 | Yuen | |
| 5,666,645 A | 9/1997 | Thomas et al. | |
| 5,684,525 A | 11/1997 | Klosterman | |
| 5,694,163 A | 12/1997 | Harrison | |
| 5,701,383 A | 12/1997 | Russo et al. | |
| 5,717,452 A | 2/1998 | Janin et al. | |
| 5,724,203 A | 3/1998 | Kwoh et al. | |
| 5,727,060 A | 3/1998 | Young | |
| 5,745,710 A | 4/1998 | Clanton, III et al. | |
| 5,751,282 A | 5/1998 | Girard et al. | |
| 5,752,159 A | 5/1998 | Faust et al. | |
| 5,754,771 A | 5/1998 | Epperson et al. | |
| 5,758,257 A | 5/1998 | Herz et al. | |
| 5,760,821 A | 6/1998 | Ellis et al. | |
| 5,761,607 A | 6/1998 | Gudesen | |
| 5,768,528 A | 6/1998 | Stumm | |
| 5,778,181 A | 7/1998 | Hidary et al. | |
| 5,778,182 A | 7/1998 | Cathey et al. | |
| 5,781,226 A | 7/1998 | Sheehan | |
| 5,781,228 A | 7/1998 | Sposato | |
| 5,790,198 A | 8/1998 | Roop et al. | |
| 5,796,952 A | 8/1998 | Davis et al. | |
| 5,801,787 A | 9/1998 | Schein et al. | |
| 5,802,284 A | 9/1998 | Karlton et al. | |
| 5,805,763 A | 9/1998 | Lawler et al. | |
| 5,805,804 A | 9/1998 | Laursen et al. | |
| 5,808,608 A | 9/1998 | Young et al. | |
| 5,809,204 A | 9/1998 | Young et al. | |
| 5,812,123 A | 9/1998 | Rowe et al. | |
| 5,812,205 A | 9/1998 | Milnes et al. | |
| 5,818,438 A | 10/1998 | Howe et al. | |
| 5,819,019 A | 10/1998 | Nelson | |
| 5,828,945 A | 10/1998 | Klosterman | |
| 5,850,218 A | 12/1998 | LaJoie et al. | |
| 5,909,212 A | 6/1999 | Nishina et al. | |
| 5,949,954 A | 9/1999 | Young et al. | |
| 5,999,688 A | 12/1999 | Iggulden et al. | |
| 6,052,145 A | 4/2000 | Macrae et al. | |
| 6,058,238 A | 5/2000 | Ng | |
| 6,091,883 A | 7/2000 | Artigalas et al. | |
| 6,091,884 A | 7/2000 | Yuen et al. | |
| 6,115,057 A | 9/2000 | Kwoh et al. | |
| 6,122,011 A | 9/2000 | Dias et al. | |
| 6,125,231 A | 9/2000 | Yuen et al. | |
| 6,147,715 A | 11/2000 | Yuen et al. | |
| 6,167,188 A | 12/2000 | Young et al. | |
| 6,177,931 B1 | 1/2001 | Alexander et al. | |
| 6,208,335 B1 | 3/2001 | Gordon et al. | |
| 6,233,389 B1 | 5/2001 | Barton et al. | |
| 6,240,241 B1 | 5/2001 | Yuen | |
| 6,324,338 B1 | 11/2001 | Wood et al. | |
| 6,441,832 B1 | 8/2002 | Tao et al. | |
| 6,473,559 B1 | 10/2002 | Knudson et al. | |
| 6,498,895 B2 | 12/2002 | Young et al. | |
| 6,601,074 B1 | 7/2003 | Liebenow | |
| 6,820,278 B1 | 11/2004 | Ellis | |
| 6,850,693 B2 | 2/2005 | Young et al. | |
| 2003/0149980 A1 | 8/2003 | Hassell et al. | |
| 2003/0149988 A1 | 8/2003 | Ellis et al. | |
| 2004/0008971 A1 | 1/2004 | Young et al. | |
| 2004/0128686 A1 | 7/2004 | Boyer et al. | |
| 2004/0181814 A1 | 9/2004 | Ellis et al. | |
| 2005/0031307 A1* | 2/2005 | Kudo | 386/83 |
| 2005/0044567 A1 | 2/2005 | Young et al. | |
| 2005/0080497 A1* | 4/2005 | Rao | 700/94 |
| 2005/0204388 A1 | 9/2005 | Knudson et al. | |
| 2006/0222325 A1 | 10/2006 | Ellis | |

FOREIGN PATENT DOCUMENTS

| | | |
|---|---|---|
| EP | 0 749 242 | 12/1996 |
| EP | 0753964 | 1/1997 |
| EP | 0762756 | 3/1997 |
| EP | 0763938 | 3/1997 |
| EP | 0843468 | 5/1998 |
| EP | 0874524 | 10/1998 |
| EP | 0940985 | 9/1999 |
| JP | 10-042242 | 2/1998 |
| JP | 10-112087 | 4/1998 |
| JP | 10-164487 | 6/1998 |
| WO | WO 88/04507 | 6/1988 |
| WO | WO 90/00847 | 1/1990 |
| WO | WO 91/00670 | 1/1991 |
| WO | WO 91/07050 | 5/1991 |
| WO | WO 92/04801 | 3/1992 |
| WO | WO 92/22983 | 12/1992 |
| WO | WO 93/04473 | 3/1993 |
| WO | WO 93/08542 | 4/1993 |
| WO | WO 95/01058 | 1/1995 |
| WO | WO 95/04431 | 2/1995 |
| WO | WO 95/11567 | 4/1995 |
| WO | WO 95/18449 | 7/1995 |
| WO | WO 95/31069 | 11/1995 |
| WO | WO 95/32584 | 11/1995 |
| WO | WO 95/32585 | 11/1995 |
| WO | WO 95/32587 | 11/1995 |
| WO | WO 96/09721 | 3/1996 |
| WO | WO 96/13932 | 5/1996 |
| WO | WO 96/25821 | 8/1996 |
| WO | WO 96/27982 | 9/1996 |
| WO | WO 96/33572 | 10/1996 |
| WO | WO 96/34491 | 10/1996 |
| WO | WO 96/36172 | 11/1996 |
| WO | WO 96/41472 | 12/1996 |
| WO | WO 96/41478 | 12/1996 |
| WO | 97/13368 | 4/1997 |
| WO | WO 97/31479 | 8/1997 |
| WO | WO 97/32434 | 9/1997 |
| WO | WO 97/34413 | 9/1997 |

| | | |
|---|---|---|
| WO | WO 97/34414 | 9/1997 |
| WO | WO 97/40623 | 10/1997 |
| WO | WO 97/42763 | 11/1997 |
| WO | WO 97/46016 | 12/1997 |
| WO | WO 97/46943 | 12/1997 |
| WO | WO 97/47124 | 12/1997 |
| WO | WO 97/48228 | 12/1997 |
| WO | WO 97/48230 | 12/1997 |
| WO | WO 97/49237 | 12/1997 |
| WO | WO 97/49242 | 12/1997 |
| WO | WO 98/01995 | 1/1998 |
| WO | WO 98/06219 | 2/1998 |
| WO | WO 98/07277 | 2/1998 |
| WO | WO 98/10589 | 3/1998 |
| WO | WO 98/12872 | 3/1998 |
| WO | WO 98/16056 | 4/1998 |
| WO | WO 98/17064 | 4/1998 |
| WO | WO 98/26594 | 6/1998 |
| WO | WO 98/26596 | 6/1998 |
| WO | WO 98/38831 | 9/1998 |
| WO | WO 98/39893 | 9/1998 |
| WO | WO 98/47279 | 10/1998 |
| WO | WO 98/47283 | 10/1998 |
| WO | WO 98/47287 | 10/1998 |
| WO | WO 98/47289 | 10/1998 |
| WO | WO 99/03267 | 1/1999 |
| WO | WO 99/60790 | 11/1999 |
| WO | WO 00/16548 | 3/2000 |

OTHER PUBLICATIONS

The New York Times, "2 Makers Plan Introduction of Digital VCR" by John Markoff, Mar. 29, 1999.

Hofmann, Neumann, Oberlies, and Schadwinkel, "Videotext Programmiert Videorecorder," Rundfunktechnische Mitteilungen, Nov.-Dec. 1982, pp. 254-257 (translation attached).

"Electronic Programme Guide (EPG); Protocol for a TV Guide using electronic data transmission" by European Telecommunication Standards Institute, May 1997, Valbonne, France, publication No. ETS 300 707.

"Windows 98 Feature Combines TV, Terminal and the Internet," *New York Times*, Aug. 18, 1998.

"Digital Video Broadcasting (DVB); DVB specification for data broadcasting", European Telecommunications Standards Institute, Draft EN 301 192 V1.2.1 (Jan. 1999).

Rewind, replay and unwind with new high-tech TV devices, by Lawrence J. Magid, *LA Times*. This document was printed from the Internet on Jun. 6, 1999 and bears a date of May 19, 1999.

http://www.iapplianceweb.com/story/OEG20040510N0003BC.htm (May 11, 2004).

Inside I-Guide User's Manual (Aug. 24, 2004).

TivoToGo (printed Mar. 8, 2006).

* cited by examiner

SYSTEM AND METHODS FOR RECORDING AND PLAYING BACK PROGRAMS HAVING DESIRABLE RECORDING ATTRIBUTES

BACKGROUND OF THE INVENTION

This invention is directed to systems and methods for recording programs and more particularly, systems and methods for ensuring that recorded programs have desirable recording attributes.

Recording devices, such as digital video recording (DVR) devices, are well known in the art. Often, a user of a DVR device may find that a recorded program lacks desirable recording attributes. For example, the recorded program may have been interrupted, it may be missing the beginning or the end of the program, it may have incorrect content, or it may lack some other desirable recording attribute. As another example, the DVR device may direct a tuner that is recording a program to stop recording the program and record another, higher priority program. In some embodiments, the DVR may record an analog transmission of a program instead of a digital or high-definition transmission of the program, which the user finds more desirable. If the user needs to see the program before the next transmission time, the user is left with a program lacking desirable recording attributes and no easy means of acquiring a suitable copy.

Accordingly, it would be desirable to provide video recording systems and methods for recording multiple copies of a program to attempt to ensure that the user will have a copy of the program for playback which does not lack desirable recording attributes.

SUMMARY OF THE INVENTION

This and other objects of the present invention is accomplished in accordance with the principles of the present invention by providing an interactive television application coupled with a recording device. In response to a user's request to record a program, the interactive television application records multiple copies of the program using the recording device. In some embodiments, the interactive television application may, in response to the user's request, schedule the recording of the multiple copies of the program. In other embodiments, the interactive television application may instead determine whether multiple copies of the program should be recorded. For example, the interactive television application may prompt the user to request that multiple copies be recorded, or it may automatically decide to record multiple copies of a program based on, for example, attributes of the program or other variables (e.g., based on whether the program is a high priority program).

In some embodiments, the interactive television application determines whether the user's equipment has any limitations that would prevent recording multiple copies. If any limitations are identified, the interactive television application may attempt to remove or overcome the limitations (e.g., by freeing a tuner or freeing space to record a program), or it may prompt the user to take actions to overcome the limitations (e.g., by canceling another recording or by decreasing the number of copies of the program that will be recorded). In some embodiments, the interactive television application may determine an optimum number of copies of the program to record and set recording options for the recordings. This may optimize the use and availability of resources in the user's equipment while still attempting to ensure that a copy of a program with desirable recording attributes is still recorded.

When a user requests a program for playback after multiple copies of the program have been recorded, a particular copy is selected. In some embodiments, the user selects the particular copy of the program for playback. In other embodiments, the interactive television application automatically selects the particular copy. The interactive television application may, for example, automatically select the best available copy of the program based on the recording attributes of each copy. The best available copy may be the copy having the most desirable recording attributes.

At an appropriate time, such as after selecting a copy of the program for playback, the user or the interactive television application may determine whether the copy lacks desirable recording attributes.

The user may determine whether a copy lacks desirable recording attributes by, for example, reviewing an informational display provided by the interactive television application that indicates the recording attributes of the recorded copies of the program. Alternatively, the user may make this determination by playing back a copy of the program and, while viewing the program, noticing that the copy lacks desirable recording attributes (such as by noticing the program was interrupted or cut short). When the user determines that a copy lacks desirable recording attributes, the user may indicate it to the interactive television application. In response to this indication, the interactive television application allows the user to select, or itself selects, another copy of the program.

The interactive television application may determine that a copy lacks desirable recording attributes by, for example, examining the recording attributes of the copy itself, by examining program data provided to the interactive television application (e.g., blackout information provided as part of a program guide data feed), or using any other suitable approach. After determining that a copy lacks desirable recording attributes, the interactive television application selects another copy.

In some approaches these operations, determining that a selected copy of the program lacks desirable recording attributes and selecting another copy of the program, may be repeated until a copy that has desirable recording attributes, or the most desirable recording attributes among the copies, is found.

When the user determines that a copy lacks desirable recording attributes while watching the program and a second copy is selected, the interactive television application may start playing back the second copy either at its beginning, or at the position at which the first copy ended prior to switching. In some cases, to ensure that no portion of the program is missed, the interactive television application may start the second copy at a position slightly earlier than the position at which the first copy ended prior to switching.

BRIEF DESCRIPTION OF THE DRAWINGS

The above and other features of the present invention, its nature and various advantages will be more apparent upon consideration of the following detailed description, taken in conjunction with the accompanying drawings, and in which.

DETAILED DESCRIPTION

Figure 1:
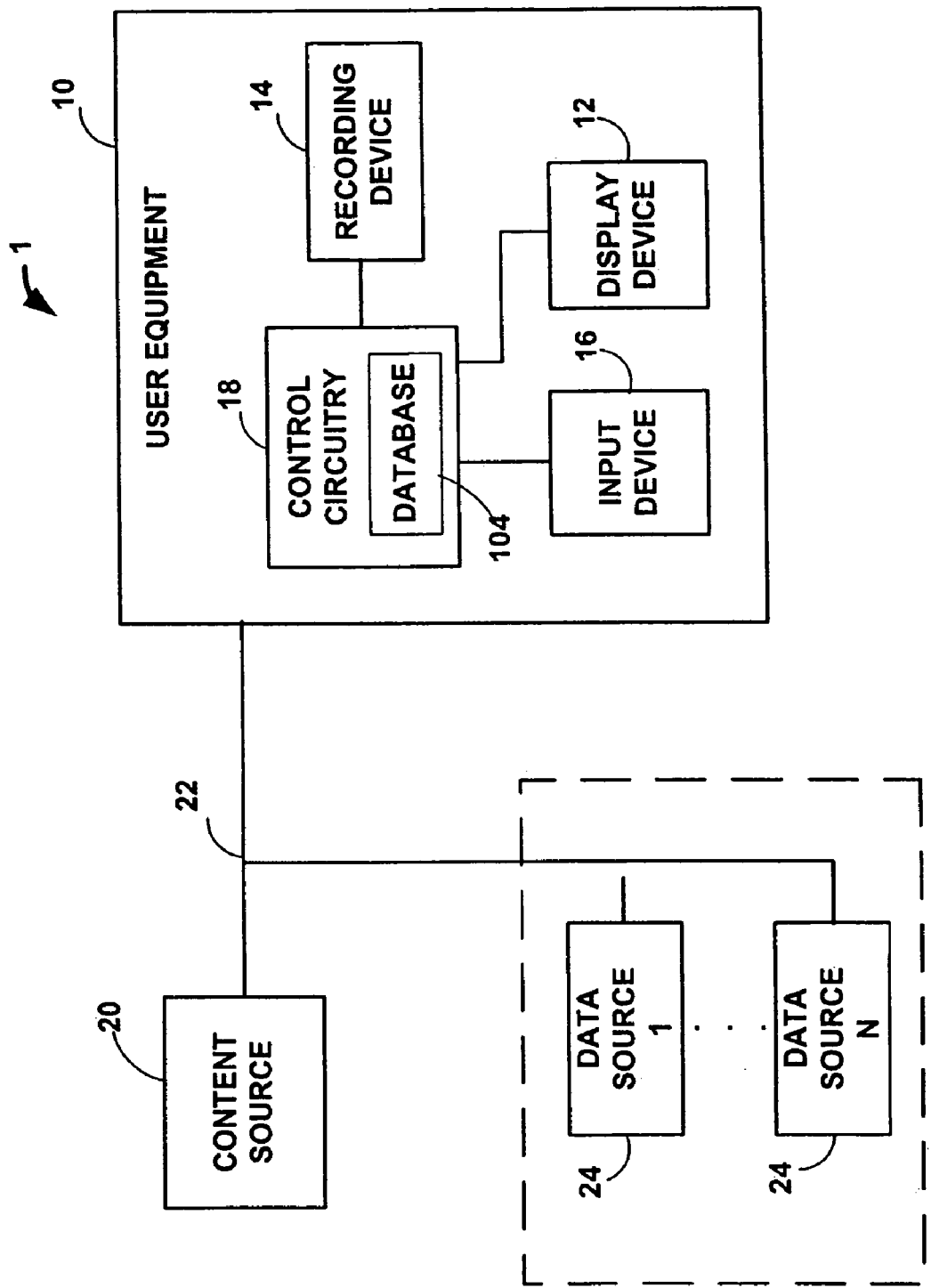
FIG. 1 is a diagram of an illustrative interactive television system in accordance with one embodiment of the present invention.

FIG. 1 shows illustrative interactive television system 1 in accordance with one embodiment of the invention. User equipment 10 receives content in the form of signals from content source 20 over communications path 22. In practice there may be multiple content sources. For clarity, only one is shown in FIG. 1. Also in practice, there may be multiple instances of user equipment 10 coupled to content source 20 and data source 24. For the clarity of the figure, the user equipment of only a single user is shown.

Content source 20 may be any suitable content source such as, for example, a cable system headend, satellite television distribution facility, television broadcast facility, on-demand server (e.g., video-on-demand (VOD) server), or any other suitable facility or system for originating or distributing content. Content source 20 may be configured to transmit signals over any suitable communications path 22 including, for example, a satellite path, a fiber-optic path, a cable path, or any other suitable wired or wireless path. The signals may carry any suitable content such as, for example, television programs, music, news, web services, or any other suitable content. The signals may be transmitted as a broadcast, multicast, unicast, or any other suitable transmission stream.

User equipment 10 may include any equipment suitable for providing an interactive television experience. For example, user equipment 10 may include computer equipment, such as a personal computer with a television card (PCTV). User equipment 10 may include television equipment such as a television, set-top box, recording device, video player, user input device (e.g., remote control, keyboard, mouse, touch pad, touch screen, voice recognition interface, etc.) or any other device suitable for providing an interactive television experience. For example, user equipment 10 may include a DCT 2000, 2500, 5100, 6208 or 6412 set-top box provided by Motorola, Inc.

In the example of FIG. 1, user equipment 10 includes at least control circuitry 18, display device 12, recording device 14, and user input device 16, which may be implemented as separate devices or as a single device. An interactive television application, such as an interactive television program guide, may be implemented on user equipment 10 to direct a tuner in control circuitry 18 to display, on display device 12, the content transmitted by content source 20 over path 22 and to provide interactive television application features.

Recording device 14 may be a personal video recorder (PVR), digital video recorder (DVR), video cassette recorder (VCR), DVD-recorder, or any other suitable video recorder. Recording device 14 may include one or more tuners. In some embodiments, recording device 14 may be accessed by the interactive television application over an in-home network (e.g., an Ethernet network).

Display device 12 may be any suitable device such as, for example, a television monitor or a computer monitor. Display device 12 may also be configured to provide for the output of audio.

Control circuitry 18 is adapted to receive user inputs from input device 16, execute the instructions of the interactive television application, direct recording device 14 to record programs (and copies of programs), and direct display device 12 to display programs and interactive television application display screens. Control circuitry 18 may include one or more tuners (e.g., analog or digital tuners), encoders and decoders (e.g., MPEG encoders and decoders), processors (e.g., Motorola 68000 family processors), memory (i.e., RAM and hard disks), communications circuitry (e.g., cable modem circuitry), input/output circuitry (e.g., graphics circuitry), connections to the various devices of user equipment 10 (e.g., recording device 14), and any other suitable component for providing analog or digital television programming, program recording, and interactive television features. In one embodiment, control circuitry 18 may be included as part of one of the devices of user equipment 10 such as, for example, part of recording device 14, display 12, or any other device (e.g., a set-top box, television, video player, etc.). Control circuitry 18 may include memory for storing the instructions of the interactive television application and database 104. Database 104 stores data from data sources 24 and other data for use by the interactive television application (e.g., user profiles, recorded program lists, equipment settings, or other suitable information). Database 104 also includes information about recordings and scheduled recordings, such as the recording attributes of recordings and recording options, both of which are discussed below. In other embodiments, database 104 is stored in other portions of user equipment 10, or on a stand-alone device (e.g., another device in the home or a device accessed via path 22).

User equipment 10 may receive interactive television application data from one or more data sources 24. Data sources 24 may provide data for a particular type of content, or for a particular application. For example, one data source 24 may provide data for non-on-demand assets (e.g., non-pay and pay-per-view television programs), and another may provide data for on-demand assets (e.g., VOD programs). Or, for example, a single data source may provide both of these types of data. In some embodiments, one data source 24 may provide data for an interactive television program guide, and another may provide data for another interactive television application running on user equipment 10 (e.g., a home shopping application). In some embodiments, data sources 24 may provide data to the interactive television application using a client/server approach. There may be one server per data source, one for all sources, or, in some embodiments, a single server may communicate as a proxy between user equipment 10 and various data sources 24.

Content source 20 and data sources 24 are shown in FIG. 1 as separate elements. In practice, their functionality may be combined and provided from a single system at a single facility, or multiple systems at multiple facilities. For example, one content source 20 and data source 24 may be combined to provide VOD content and associated VOD data.

Figure 2:
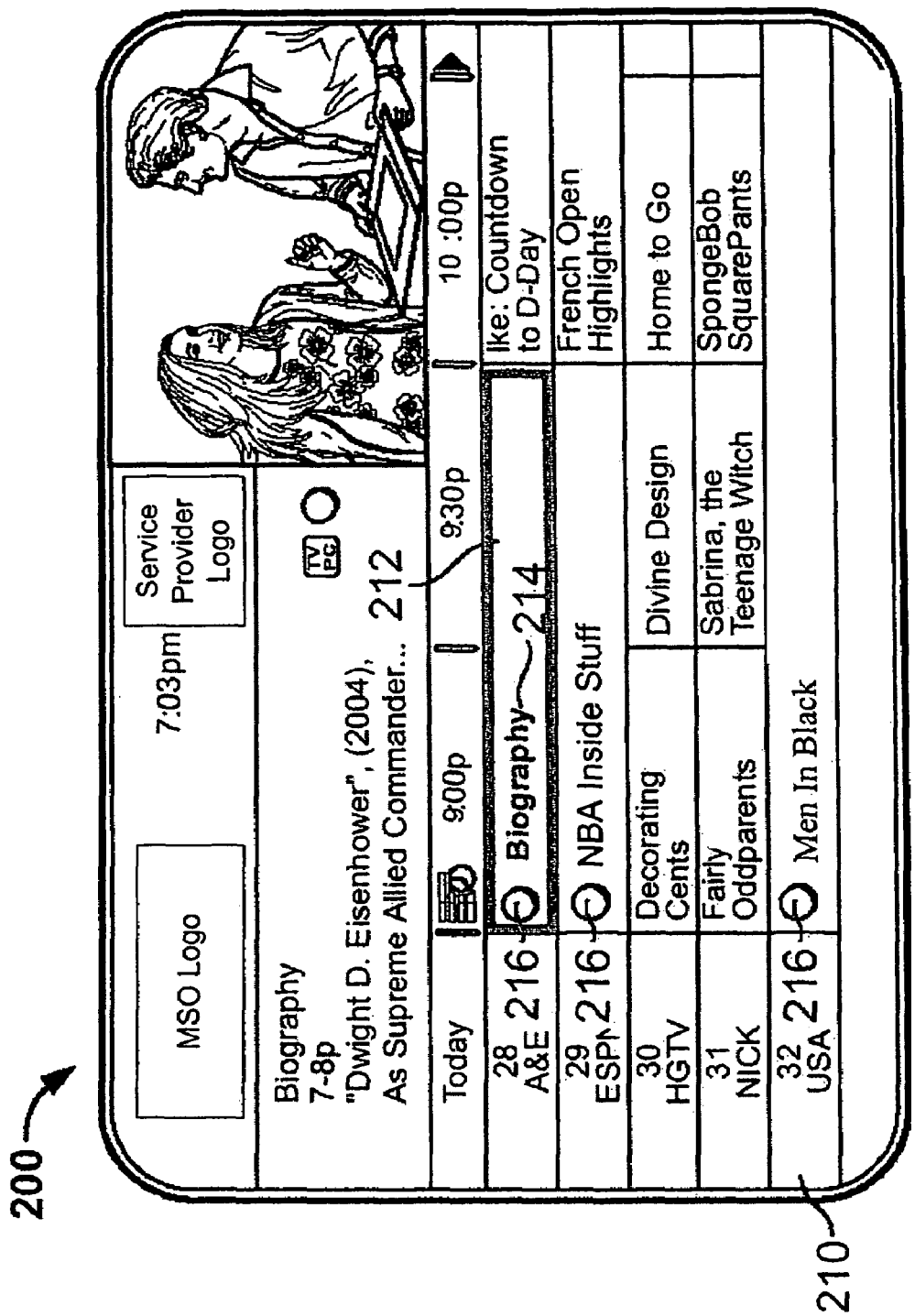
FIG. 2 shows an illustrative display screen showing television program listings in accordance with one embodiment of the present invention.

FIG. 2 shows an illustrative program guide screen 200 that the interactive television application may display on display device 12. The user may access program guide screen 200 by any suitable means such as, for example, pressing a "menu," "guide," or other suitable key or key sequence on user input device 16, navigating from another program guide screen or menu, or by any other suitable means. Illustrative program guide screen 200 contains a grid of program listings 210 which includes program titles, channels, scheduled broadcast times, and other suitable program information from database 104 of FIG. 1. In other embodiments, the program guide screen may include a list (i.e., a single column) of programs. The user may select a desired program listing with highlight region 212 using user input 16, or any other suitable means.

To schedule the recording of a program or other suitable video, a user may highlight a desired program (in the example of FIG. 2, listing 214 for "Biography" on channel 28 is highlighted), and press a "Record" key or key sequence, or select a "Record" icon from the screen using user input device 16. In response, the interactive television application may direct recording device 14 to record the program. This may be indicated, for example, by recording icon 216, displayed by the listing for the program.

Figure 3:
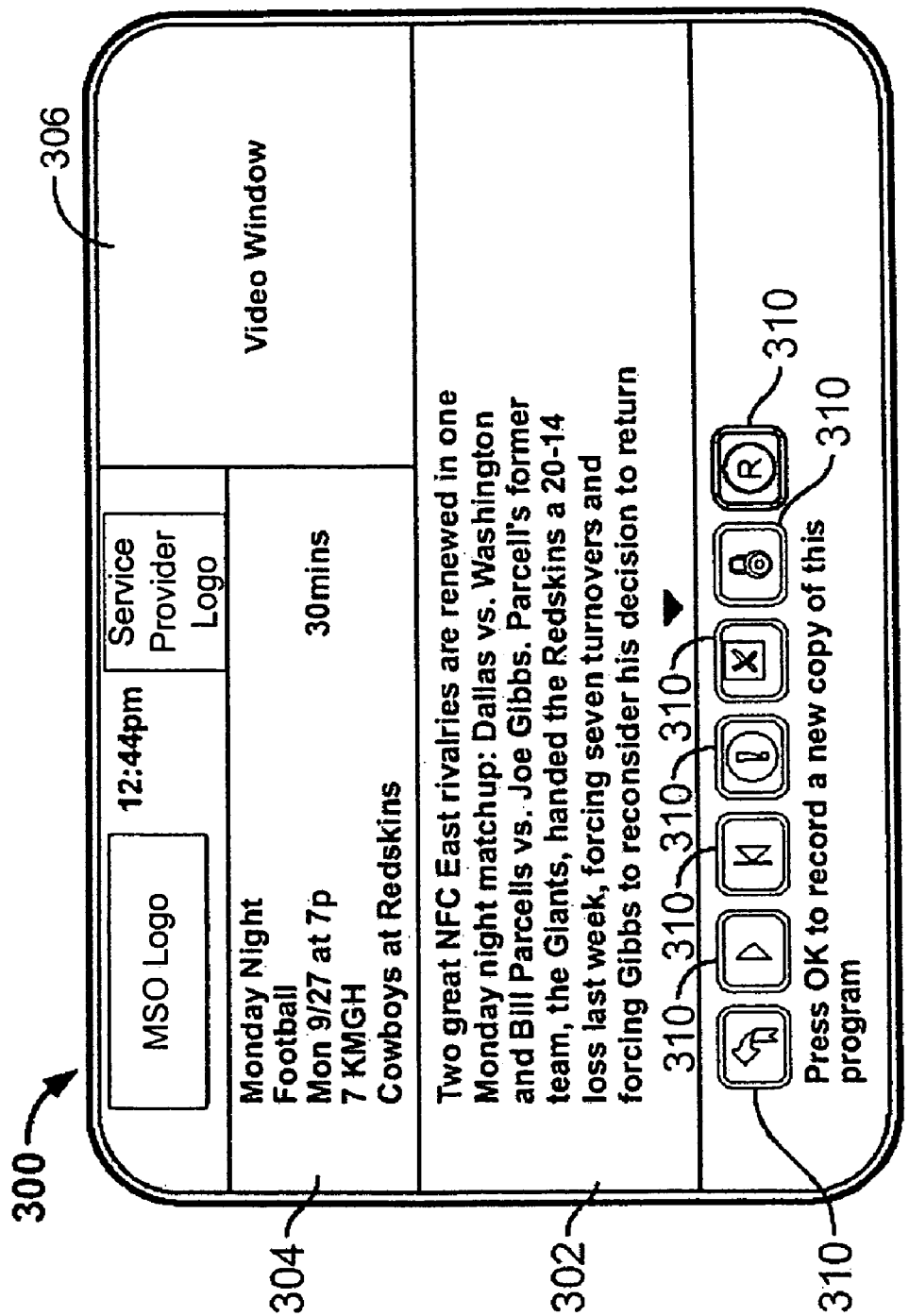
FIG. 3 shows an illustrative display screen showing information relating to a television program in accordance with one embodiment of the present invention.

Prior to choosing to record a program, the user may request additional information regarding the program. For example, a user may highlight a listing using highlight region 212 and press an "Information" key or key sequence on user input device 16. In response to receiving the user request, the interactive television application may display an information screen. FIG. 3 shows illustrative information screen 300, which includes detailed information section 302, program description area 304 (including the program title, time and channel), and video window 306.

Screen 300 also includes selectable icons 310, some or all of which may include text descriptions upon being highlighted by the user. The screen may include icons for recording of programs, series recording, parental control locks, or any other suitable interactive television application action. If a user determines that he wants to record the program, the user may schedule the recording by pressing a "Record" key or key sequence, selecting a "Record" icon (shown highlighted) from the screen using user input device 16, or by any other suitable means.

Figure 4:
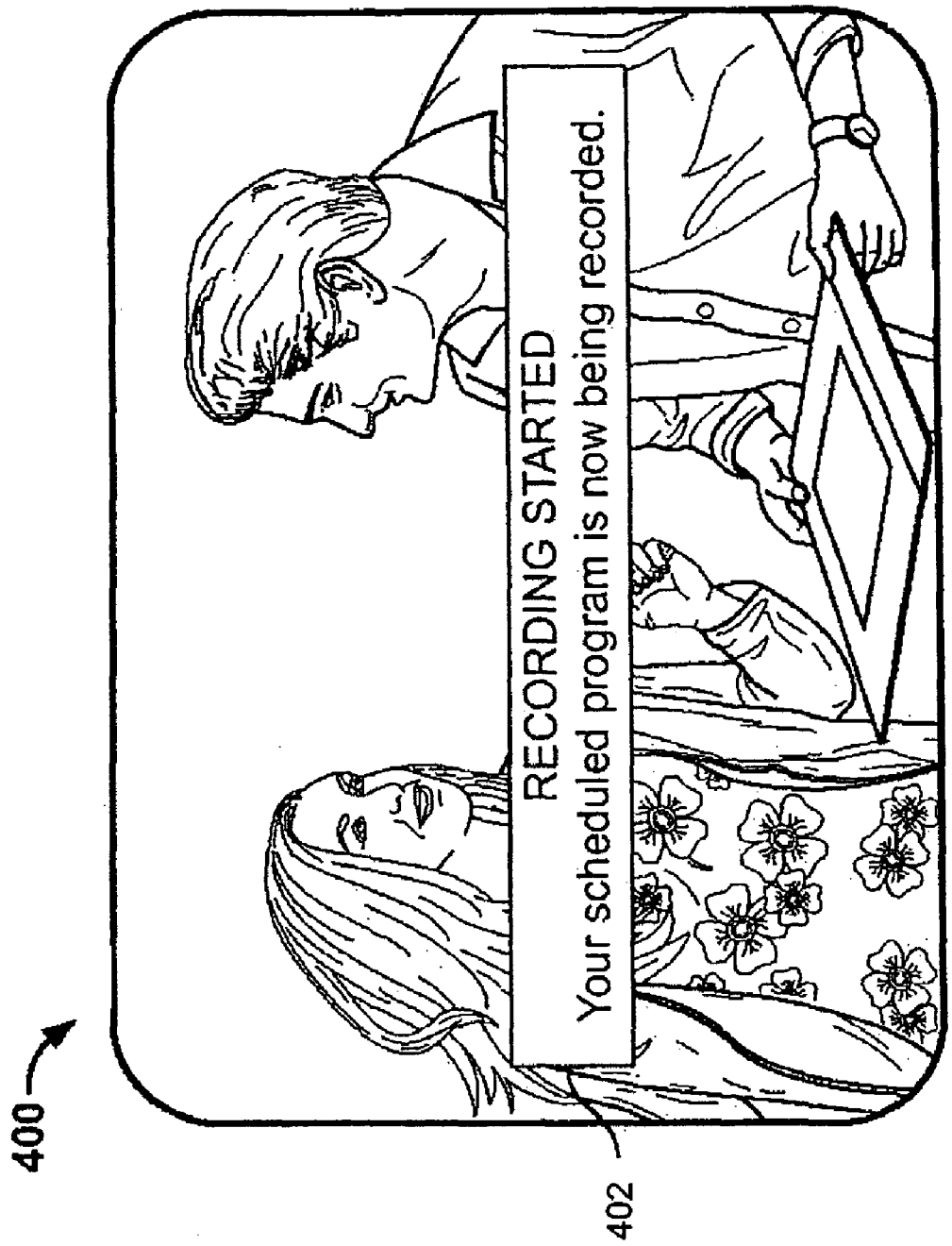
FIG. 4 shows an illustrative display screen showing a television program in full screen after a recording has commenced in accordance with one embodiment of the present invention.

In some embodiments, the user may be watching a program on display device 12 in a full screen view, for example full screen view 400 shown in FIG. 4, and decide to record the program. To record the program, the user may press a "Record" key or key sequence on user input device 16, or use any other suitable means. A pop-up notice, such as pop-up notice 402, may appear to confirm that recording has begun. The interactive television application may also display the notice in response to receiving a user confirmation to record the program (e.g., in response to a user confirming the recording with menu 502 of FIG. 5). In some embodiments, the interactive television application may direct pop-up notice 402 to appear automatically when a previously-scheduled recording commences.

To attempt to ensure that the user will have a copy of a program selected for recording that does not lack desirable recording attributes, the interactive television application may record multiple copies of the scheduled program. In some embodiments, the interactive television application may record multiple copies of each program scheduled for recording by default. For example, the user may enable or disable a feature that instructs the interactive television application to record multiple copies of each program by default. The number of copies to record for each program may be automatically set or set in response to a user instruction. In some embodiments, the number of copies scheduled for recording for each program may depend on a recording option set for the program (e.g., recording priority). For example, the interactive television application may by default schedule three copies of "high priority" programs, two copies of "medium priority" programs, and one copy of "low priority" programs.

In some embodiments, instead of recording multiple copies of each program by default, the interactive television application may first determine whether or not multiple copies of the program should be recorded. The interactive television application may make this determination in a number of ways. In some embodiments, the user may request that multiple copies of a program may be recorded. In such embodiments, for example, the interactive television application may provide an option that the user may select to record multiple copies. As another example, the interactive television application may allow the user to specify a recording priority for the program and determine whether to record copies based on the priority. For example, the user may designate a program as "high" priority to indicate that the user has a higher interest in recording the program.

Figure 5:
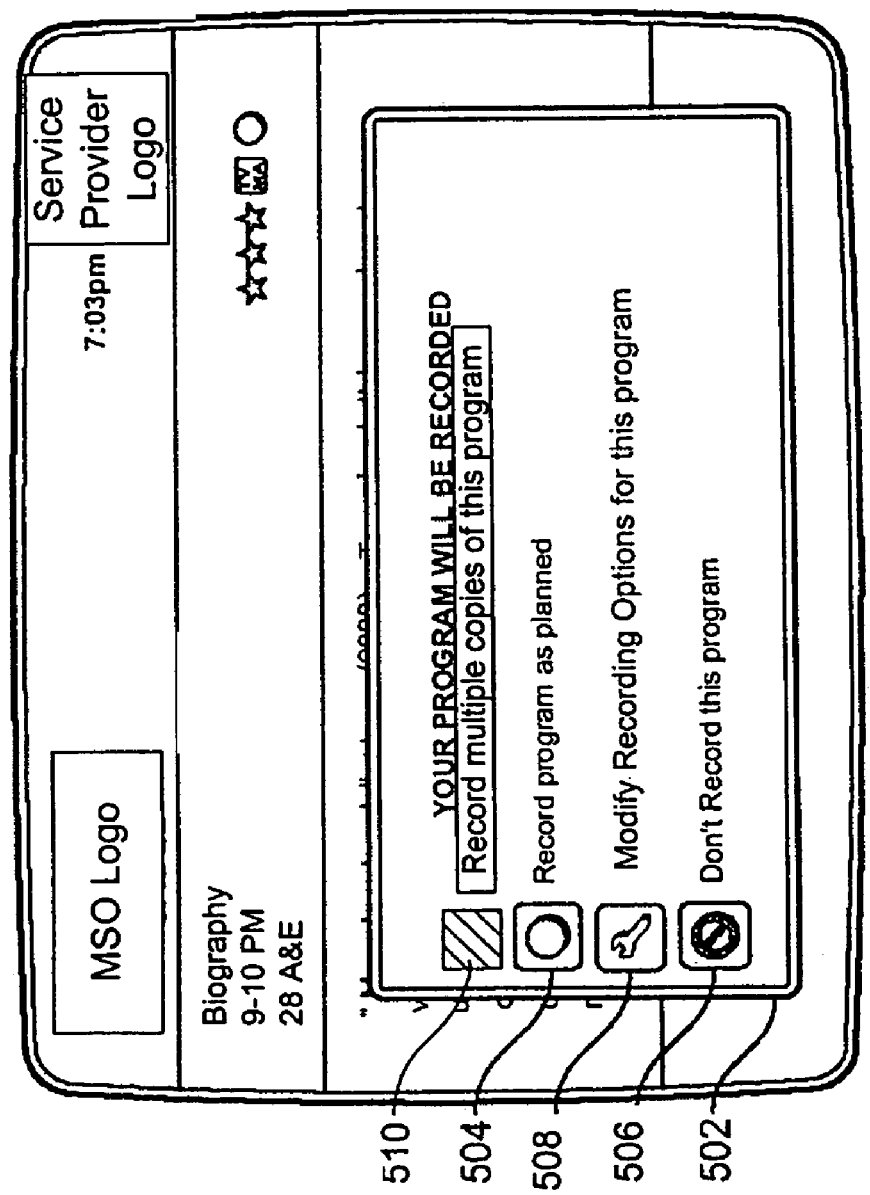
FIG. 5 shows an illustrative display screen containing an option to record multiple copies of a program in accordance with one embodiment of the present invention.
Figure 6:
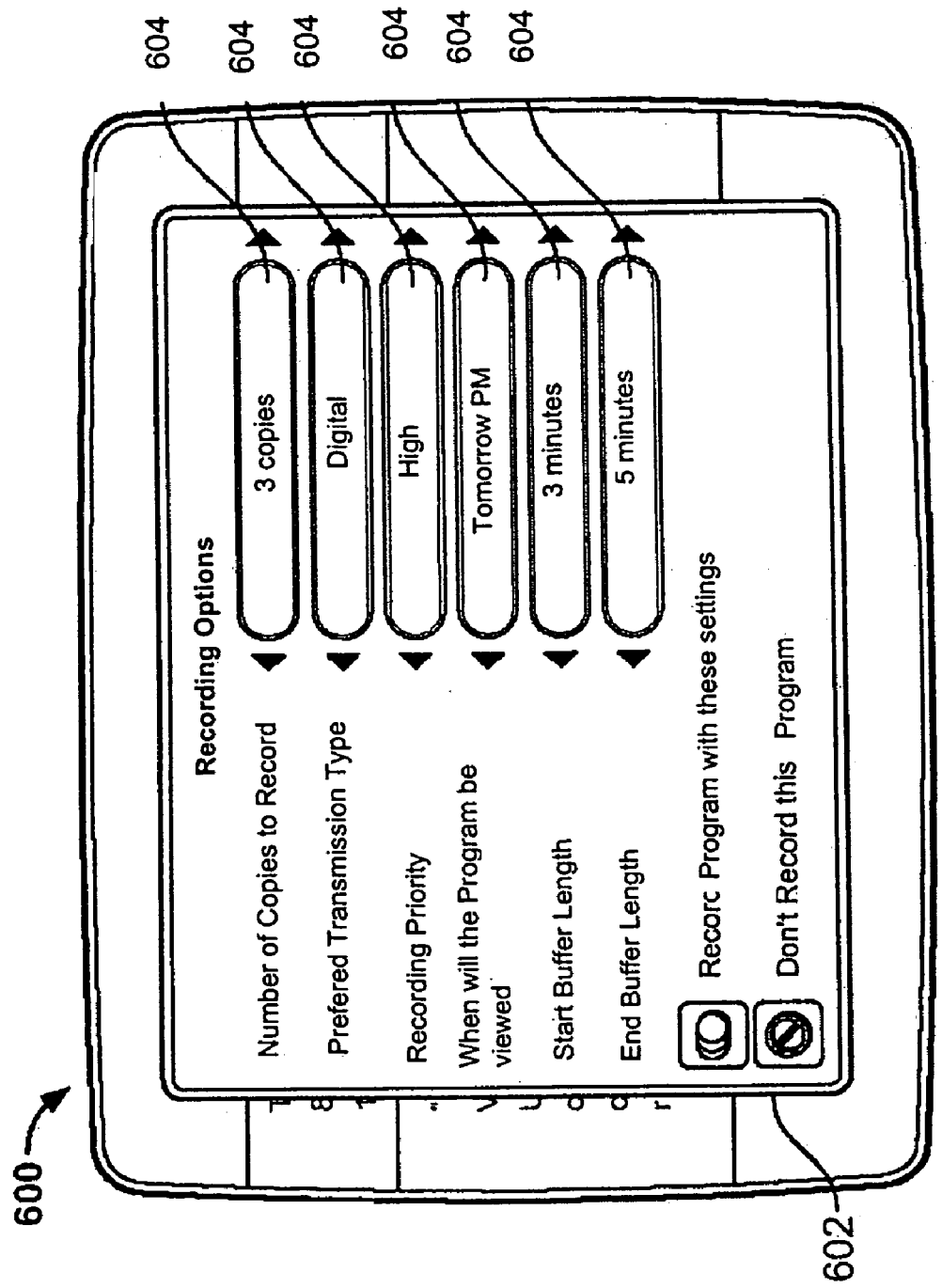
FIG. 6 shows an illustrative display screen showing recording options in accordance with one embodiment of the present invention.

FIG. 5 shows an illustrative screen 500 with illustrative pop-up menu 502 that the interactive television application may display to prompt the user for a request to record multiple copies of a program. Pop-up menu 502 includes a notice confirming the scheduling of the recording, as well as selectable icons 504 and 506 for confirming or canceling the recording. Pop-up menu 502 also includes icon 508 for setting or modifying recording options, and icon 510 for recording multiple copies of the program. The pop-up menu may also include any other suitable icons. In some embodiments, the interactive television application may conditionally display the option to record multiple copies (e.g., icon 510) in response to a user setting at least a particular recording priority (e.g., high). In other embodiments, the interactive television application may display a pop-up menu with an option to record multiple copies (e.g., pop-up menu 602, FIG. 6) in response to a user selection of the option to set or modify recording options (e.g., icon 508). In some embodiments, the interactive television application may display icon 510 only if it determines that the program has multiple airings or is a type of program that is likely to have multiple airings.

In addition, or as an alternative, to allowing a user to specify whether multiple copies of a program should be recorded, the interactive television application may automatically determine whether multiple copies of a program should be recorded. The interactive television application may make this determination based on criteria such as, for example, the identity of the user requesting a program, the user's viewing history, the transmission time, the channel or theme of a program, whether the program has been transmitted, viewed or recorded before, the priority of the program, or any other suitable criteria.

Recording options may be set by the user or by the interactive television application to specify how copies of a program should be recorded. Recording options may include, for example, the channel to record, transmission type, resolution, or buffer lengths. Recording attributes, which have been referred to already herein, are different from recording options because recording attributes indicate or describe actual characteristics of copies of a program as recorded in the user equipment. Such attributes may include, for example, complete/non-interrupted recording, correct program content, transmission type, resolution, or other attributes. Some attributes may correspond directly to a recording option set by the user (e.g., transmission type, resolution), but others may not (e.g., complete/non-interrupted recording, correct program content).

In some embodiments, the interactive television application may automatically set recording options for each copy of the program. For example, the interactive television application may set the recording priority of the additional copies of a program to be lower than that of the original copy of the program. In other embodiments, the interactive television application may prompt the user to set recording options for each additional copy of the program. For example, the interactive television application may display successive screens or pop-ups, such as pop-up menu 602 shown in FIG. 6, for each copy until the user has set options for all of the copies. Pop-up menu 602 includes a plurality of recording options 604. Recording options 604 include, in this example, the number of copies to record, which transmissions to record if multiple transmissions are available (e.g., analog, digital, or high definition), recording priority, when the user intends on viewing the program, start buffer length (e.g., for recording the beginnings of programs that start early) and end buffer length (e.g., for recording the ends of programs that run late). Any of the options may or may not be available. In some embodiments, the recording options pop-up menu may include any other suitable recording option (e.g., resolution, which channel to record, bit rate, recording size, or how long to keep the recording) in addition to or instead of the options shown in FIG. 6.

The following example illustrates possible recording options that may be set by the user or automatically by the interactive television application (or a combination of both) for three copies of a program. An original copy (i.e., the originally selected program) may be set with default recording options (e.g., system default options). A second copy of the program may be set with more desirable recording options (e.g., high-definition transmission, larger buffers, or higher resolution) to attempt to ensure that a copy is recorded with the most desirable recording attributes. Finally, a third copy of the program may be set with less desirable recording options (e.g., analog transmission, no buffers, or lower resolution) to maintain a backup copy that takes the least amount of space possible in the user equipment (e.g., recording device 14). Varying recording options for different copies allows for optimizing the use of resources in the system while still attempting to obtain a copy of the program that does not lack desirable recording attributes.

To schedule multiple copies of a program for recording, the interactive television application examines, for example, its schedule data and on-demand listings data received from one or more data sources 24. Current transmissions of the program may be recorded immediately in embodiments where control circuitry 18 has a sufficient number of tuners. Once multiple copies are scheduled for recording.

Whether by default or after determining that copies should be scheduled, the interactive television application may determine whether user equipment 10 has any limitations that would prevent recording the multiple copies of the program. For example, the interactive television application may determine whether there is sufficient space for storing the multiple copies in recording device 14 or other devices in the user's in-home network, or whether there is a sufficient number of tuners available in user equipment 10 for the given recordings. Each of these examples are discussed in more detail below. Other potential limitations may include hardware or software limitations of user equipment 10 (e.g., software limitations on the number of programs that recording device 14 can simultaneously record).

Figure 7:
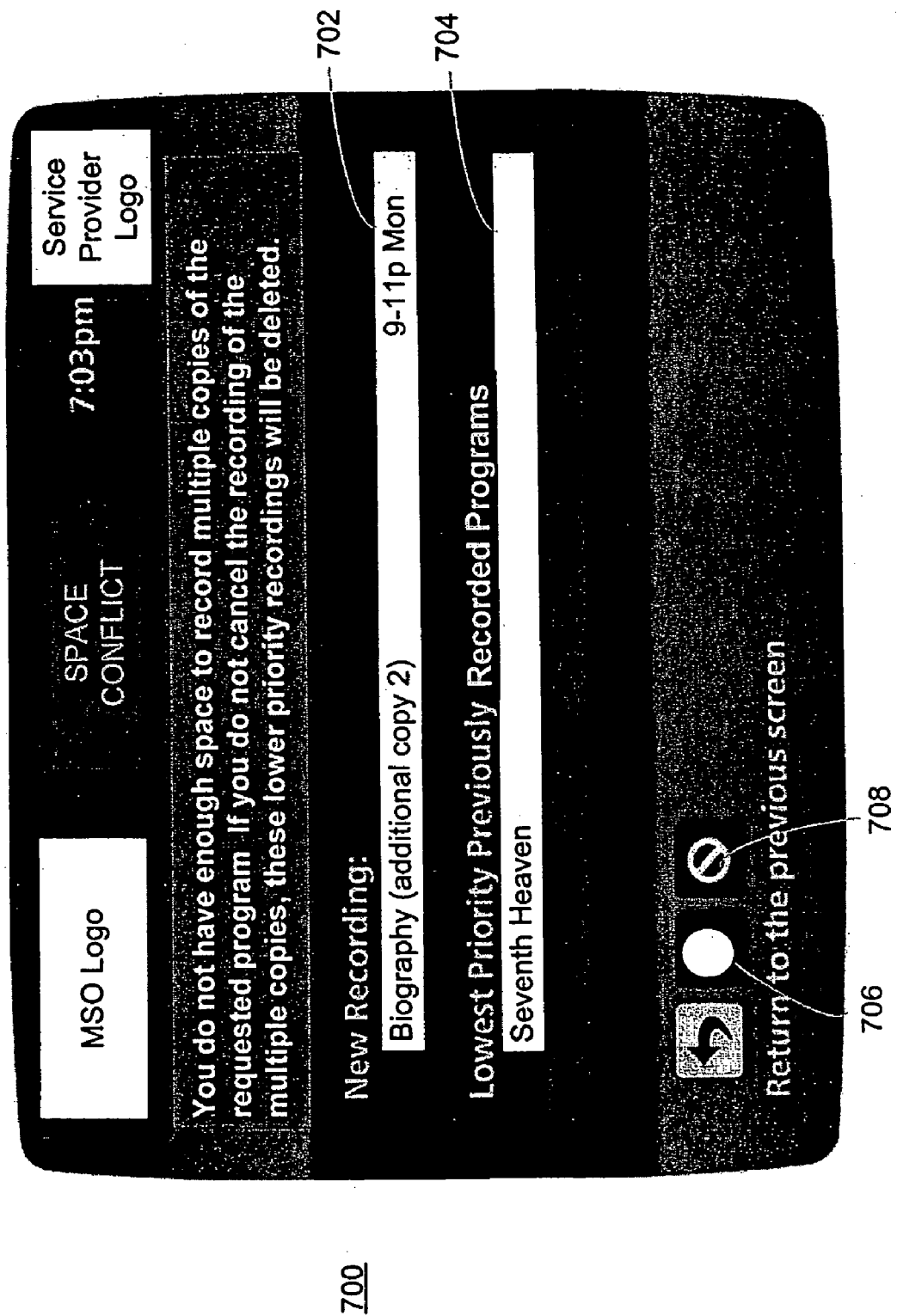
FIG. 7 shows an illustrative display screen showing a recording space conflict notice in accordance with one embodiment of the present invention.

In some embodiments, in response to determining that there is not enough space to record multiple copies, the interactive television application may provide the user with a conflict notice that prompts the user to cancel recording multiple copies of the program. In addition to, or instead of, the conflict notice, the interactive television application may prompt the user with a display to delete recorded programs to make room for the multiple copies. One such display is illustrative display 700 shown in FIG. 7. Display 700 indicates to the user that the interactive television application will direct recording device 14 to record an additional copy of "Biography," shown in listing 702, and to delete a previously recorded program, "Seventh Heaven," shown in listing 704. The user may select icon 706 to proceed with the deletion or select icon 708 to cancel the recording of the additional copy of "Biography." In this example, the interactive television application has suggested deleting "Seventh Heaven." In some embodiments, the interactive television application may suggest deleting extra copies of previously viewed and unviewed programs, or programs with a lower recording priority than the program to be recorded (e.g., Biography).

In some embodiments, the interactive television application may automatically delete recorded programs from the user equipment (e.g., extra copies of previously viewed and unviewed programs, and programs with a lower recording priority than the program to be recorded) to create space for recording multiple copies of a program. When the interactive television application determines that there are no suitable recorded programs to delete (e.g., all recorded programs have a higher recording priority than the program), the interactive television application may cancel recording multiple copies of the program, or prompt the user for instructions.

As mentioned above, another way the interactive television application may determine whether the user's equipment (e.g., user equipment 10) has any limitations that would prevent multiple copies of a program from being recorded is by determining whether there is a sufficient number of tuners available for all of the recordings. To determine whether there will be a sufficient number of tuners, the interactive television application may identify all current and future transmissions of the program (e.g., by looking through program schedule data provided by data source 24), and compare the expected tuner availability with the identified future transmission times. The interactive television application may determine the expected tuner availability from typical known uses of the user equipment (e.g., determined using the user viewing history) and scheduled uses of the tuners (e.g., scheduled recordings or reminders). If the interactive television application determines that the user equipment will not have enough tuners at the various transmission times to record multiple copies of the program, the interactive television application may only record copies for which tuners are available, may prompt the user for instructions, or indicate to the user that multiple copies cannot be recorded.

Figure 8:
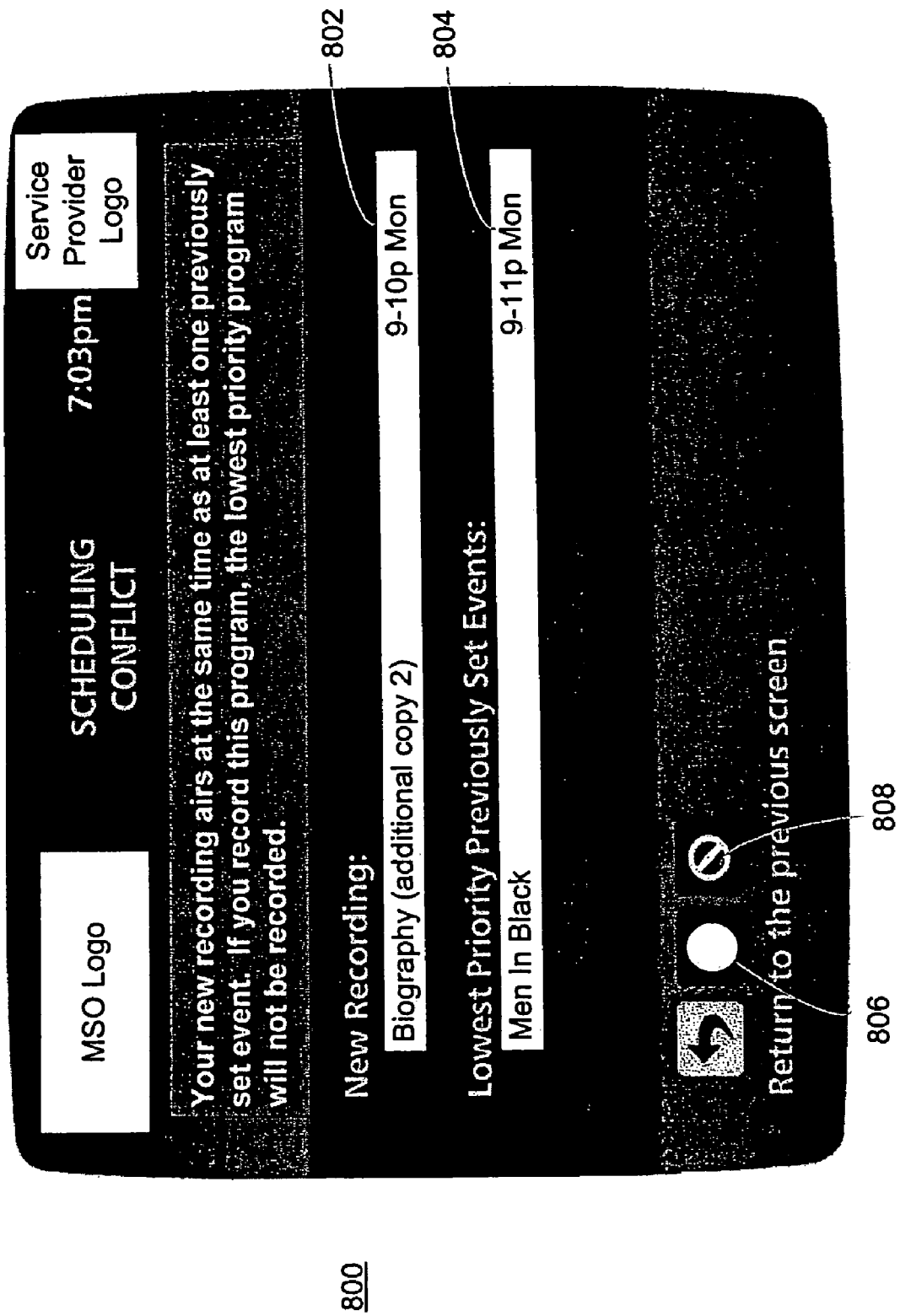
FIG. 8 shows an illustrative display screen showing a scheduling conflict notice in accordance with one embodiment of the present invention.

In instances where the interactive television application determines that the user's equipment does not have enough available tuners to record all of the multiple copies of the program, it may display a conflict display to the user. For example, illustrative conflict display 800, shown in FIG. 8, indicates to the user that the interactive television application will direct recording device 14 to record a second copy of "Biography" (listing 802) instead of the scheduled recording "Men In Black" (listing 804) because "Men In Black" has a lower priority than the second copy of "Biography." A user may select icon 806 to proceed with the recording of the second copy of "Biography", or select icon 808 to cancel the recording of "Biography". Conflict display 800 could also include listings of multiple copies of the program and allow the user to select which ones, if any, should be recorded (not shown).

In other embodiments, instead of notifying the user of the conflict, the interactive television application may automatically resolve the conflict using any suitable prioritization criteria. For example, the interactive television application may resolve the conflict for recording based on recording priorities of the copies, whether a recording request is an additional copy of a program, whether the requested program will be re-transmitted at a future time, or the transmission type of the copy (e.g., analog, digital, or high-definition). For example, the interactive television application may automatically select to record the single copy of "Men In Black" instead of an additional copy of "Biography" when "Men In Black" will not be transmitted again in the near future.

To place a limit on how far in the future to look for additional transmissions, the interactive television application may determine when the user will view the program. This determination may be made automatically (e.g., based on the user viewing history) or in response to a user indication (e.g., based on a user prompt such as one of recording options 604 of FIG. 6). Once the interactive television application determines when the user intends on viewing the program, it may limit the search for all other transmissions of the program to those that are prior to the intended viewing time.

The following example will illustrate how the interactive television application may schedule recordings of copies. A user decides to record the program "Biography" by selecting its corresponding or associated listing in FIG. 2 (channel 28, 9-10 PM). Upon receiving the selection, the interactive television application may display screen 600 (FIG. 6), which prompts the user to set recording options. In this example, the user decides to record three copies of the program, and intends to view the recorded program the following afternoon. Upon receiving these recording options, the interactive television application may search for all other transmissions of "Biography" that precede the intended viewing time. The interactive television application may find a 10:00 PM transmission in digital format on channel 229 and a 1:00 AM transmission in analog format on channel 28. If the user equipment has only one tuner available for each of the 9:00 PM, 10:00 PM and 1:00 AM transmissions (due to, for example, the relative priority of other scheduled recordings), the interactive television application may record an original copy at 9:00 PM on channel 28, and additional copies at 10:00 PM on channel 229 and at 1:00 AM on channel 28.

The following additional example will serve to illustrate how the interactive television application may schedule multiple copies of every program scheduled for recording by default. The user may enable a feature to record two copies of every program scheduled for recording by default. Once the original copy of a scheduled program has been recorded, the interactive television application may identify and scheduled a rebroadcast of the program. At the transmission time of the rebroadcast, the interactive television application may direct the user's equipment to record the program unless there is insufficient room to store the copy, the user's equipment does not have a free tuner, or the interactive television application has already recorded two copies of the program. If additional copies for two additional programs are scheduled for recording at the same time, the interactive television application may resolve the conflict using the recording options (e.g., recording priorities) set for the original copies of the programs. In some embodiments, recorded additional copies of some programs may be automatically deleted to make room for scheduled first copies of other programs.

Figure 9:
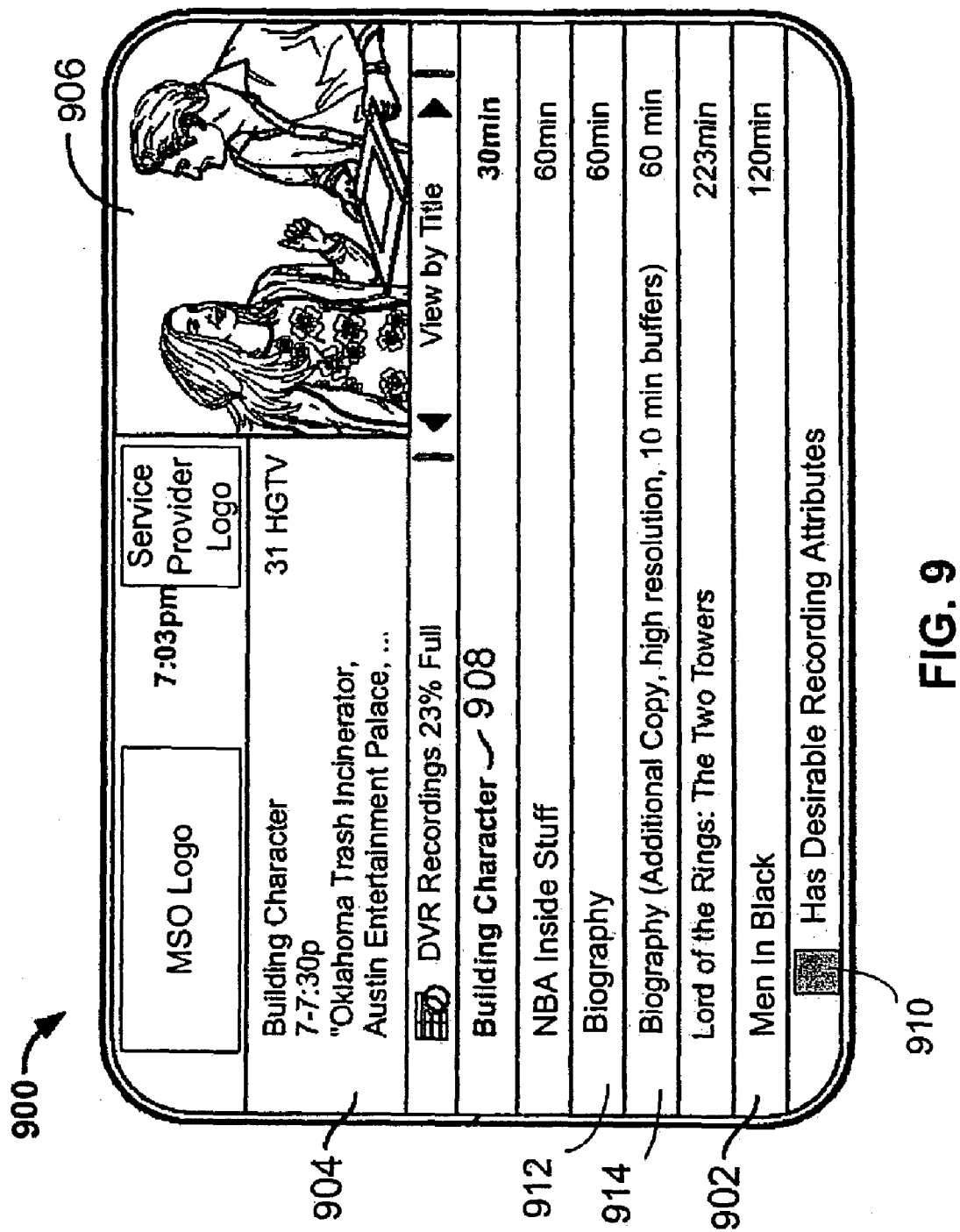
FIG. 9 shows an illustrative display screen showing a list of recorded programs in accordance with one embodiment of the present invention.

After the multiple copies of the program have been recorded, the user may access a listing display, for example listing display 900 shown in FIG. 9, to view the recorded programs. The user may access the listing display by pressing a "Recorded Programs Menu" key or key sequence, navigating from one of the interactive television application screens, or by any other suitable means. Illustrative listing display 900 includes recorded programs listings 902 (including program title and length), program description area 904 and video window 906.

In some embodiments, the recorded programs listings (e.g., listings 902) may include a separate listing for each copy of a program. To differentiate the copies, each listing may include an indication of the recording options set for the copy corresponding to or associated with the listing (e.g., listings 912 and 914). In some embodiments, each listing may include an indication of the recording attributes for the recorded copy associated with the listing. In other embodiments, the interactive television application may display a single listing for each program (e.g., an expandable listing element). The single listing may include an indication of the number of available copies of the program corresponding to the listing, and the recording options set for some or all of the copies. To view listings for each of the copies, the user may select the single listing. The interactive television application may display the additional listings, corresponding to the other copies of the program, in a new screen, pop-up menu, pop-up notice, as an expanded listing element in the original screen (e.g., as an indented list), or in any other suitable manner. Each additional listing may include an indication of the recording options set for the corresponding copy. In some embodiments, each additional listing may include an indication of the recording attributes for the recorded copy of the program.

The interactive television application may display the various indications described above in program description area 904 instead of the listings, or in a separate program information screen that is displayed, for example, when the user presses an "info" key while the listing is highlighted. In some embodiments, separate listings are not available for the individual copies. In these embodiments, a single listing is used to access the master recording, and the copies are only accessible during playback.

To play back a recorded program, the user may select the listing corresponding to the program from a menu (e.g., listing display 900) and press a "play" key or key sequence, select a play option from an interactive television application screen, or perform any other suitable step to initiate playback. If there are multiple copies of the program available, the user may select a particular copy (e.g., by selecting the corresponding listing), or the interactive television application may automatically select a particular copy. In some embodiments, the interactive television application may recommend one particular copy of the program to the user (e.g., by highlighting a listing, or displaying an icon).

In embodiments in which the interactive television application automatically selects a copy of the program for playback, the interactive television application may use any suitable criteria in selecting which program to play back. Such criteria may include, for example, the best possible copy (e.g., the one with the most desirable recording attributes among the copies without lacking desirable recording attributes), the best available copy (e.g., the one with the most desirable recording attributes among the copies), the copy with recording options similar to those of programs previously viewed, or a copy that has desirable recording attributes. The interactive television application may identify the copy of the program having the most desirable recording attributes, either automatically or in response to a user indication, as the copy having the most desirable recording attributes quantitatively or qualitatively.

When a copy of a program is selected by the user or the interactive television application for playback, the interactive television application or the user may determine whether the copy lacks desirable recording attributes. In some embodiments, the interactive television application makes this determination automatically in response to a program being selected for playback by the user or itself, but in other embodiments it may make the determination at other times. For example, the interactive television application may make the determination when the program is recorded, after all of the scheduled copies are recorded, during playback, or at some other time.

Regardless of when the interactive television application determines whether copies of a program lack desirable recording attributes, the interactive television application will at some point determine the recording attributes of the copies (e.g., determine whether (a) the recording was interrupted by a user manipulation of the tuner, (b) the wrong channel or program was recorded, or (c) an emergency broadcast replaced the originally scheduled programming). This may occur when the interactive television application determines whether desirable recording attributes are lacking, or earlier. For example, the interactive television application may determine recording attributes for a copy at the time the copy is recorded and subsequently examine those attributes after a program is selected for playback.

The interactive television application may determine recording attributes for a copy using any suitable approach. For example, it may monitor a tuner in control circuitry 18 or recording device 14 (FIG. 1) to determine whether the tuner tunes away from a recording, or monitor the power to the user's equipment to see if there is an interruption. As another example, the interactive television application may examine schedule data that it received from data source 24 to determine whether, for example, the desired copy was blacked out or not transmitted for some other reason. When the interactive television application determines the recording attributes for a copy, it may enter them in database 104 (FIG. 1). The interactive television application may indicate the attributes by, for example, indicating which desirable attributes are present and which desirable attributes are lacking. Alternatively, the interactive television application may indicate which undesirable attributes are present and which undesirable attributes are lacking. In yet another approach, a combination of these two approaches may be used.

In response to determining that a copy lacks desirable recording attributes, the interactive television application may mark the program as lacking desirable recording attributes in database 104. The interactive television application may also indicate the lack of desirable recording attributes to the user or prevent the user from accessing the copy by, for example, removing the listing from the listings display (e.g., in listings 902 of FIG. 9), identifying the lacking attributes for the user (e.g., in program description area 904 of FIG. 9), changing the order in which the listings are shown, changing which copy is automatically selected for playback, or deleting the copy from recording device 14. If the copy is being played back, the interactive television application may switch to another copy of the program. "Switching" is described below.

In some embodiments, the user may determine that a copy lacks desirable recording attributes. For example, the user may review the recording attributes while viewing listings for the copies (such as shown in FIG. 9), or while playing back the program. Should the user determine that a copy lacks desirable recording attributes during playback, the user may indicate that determination to the interactive television application (such as by pressing a key on input device 16 or by selecting an on-screen option), and switch to another copy of the program. In some embodiments, the user may switch to another copy without specifically indicating that the copy of the program lacks desirable recording attributes.

Switching to another copy may be performed using any suitable approach. For example, the user may manually switch by pausing the playback, returning to the recorded programs menu (e.g., menu 900), and selecting another copy of the program for playback. As another example, the user may instruct the application to switch by pressing a "Switch" key or suitable key sequence on user input device 16. In response to receiving this instruction, the interactive television application may display on-screen options prompting the user to select another copy of the program. In some embodiments, the instruction by the user of a desire to switch may simply cause the interactive television application to automatically select the next available copy (for example, looping through the copies as the user asks to switch). In some embodiments, in response to receiving the user instruction to switch, the interactive television application may identify the playback position of the copy of the program that is playing when the switch instruction is received and play back the selected copy at substantially the same playback position (e.g., a slightly earlier playback position).

Figure 10:
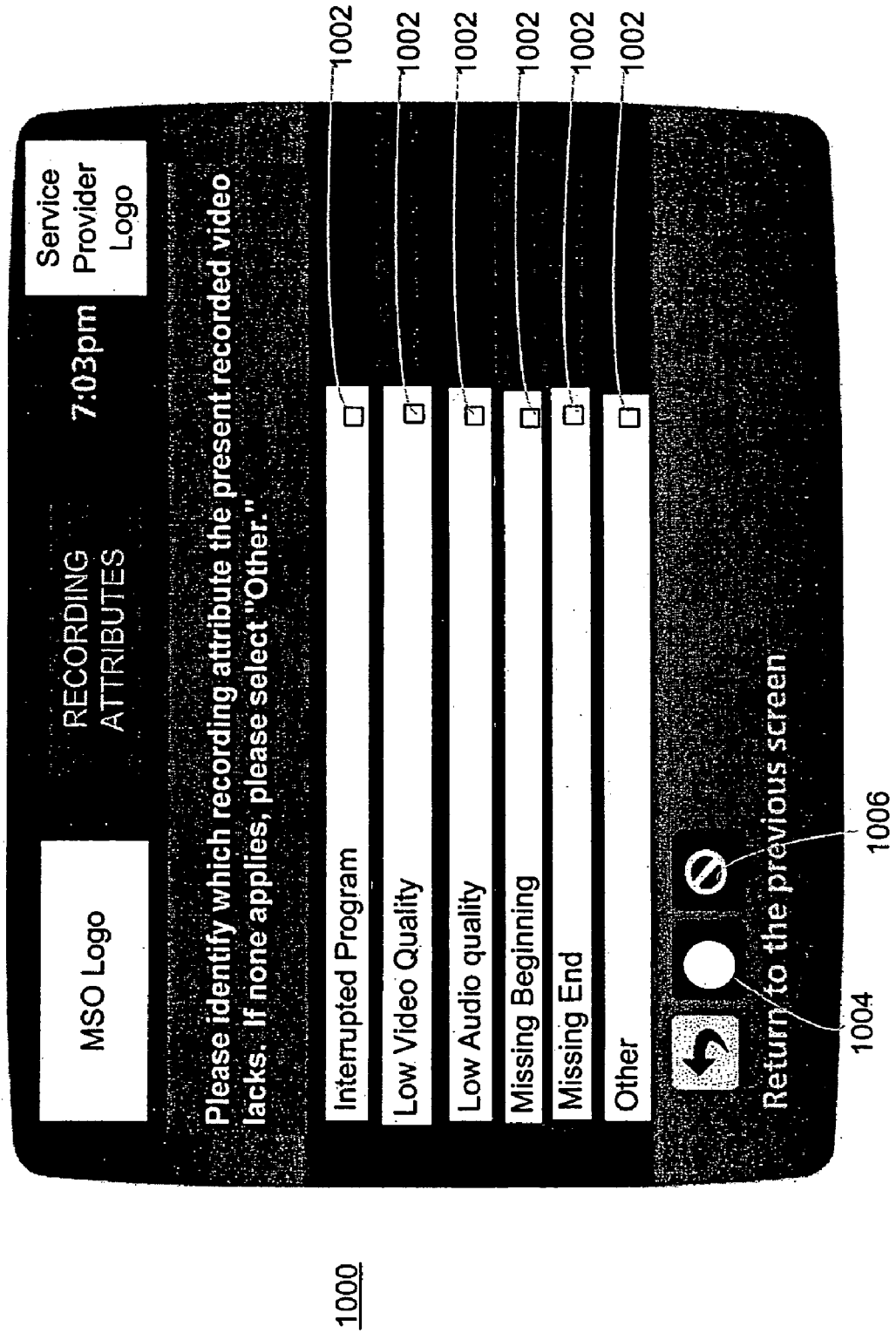
FIG. 10 shows an illustrative display screen showing options for allowing a user to indicate which recording attributes are lacking for a program in accordance with one embodiment of the present invention.

In some embodiments, in response to receiving a user indication to switch copies of the program, the interactive television application may prompt the user to identify which desirable recording attributes are lacking. Illustrative display screen 1000 of FIG. 10, for example, includes selectable boxes 1002 that correspond to lacking desirable recording attributes (e.g., interrupted program, or video/audio quality). Once the user has selected one or more boxes 1002, the user may select an option (e.g., icon 1004) to submit the selections to the interactive television application, or select an option (e.g., icon 1006) to cancel the submission. In response to the submission, the interactive television application may select and play back, or recommend, a copy of the program that does not lack the identified desirable recording attributes. The interactive television application may also, in response to the submission, mark the copy of the program by changing a database entry corresponding to the copy of the program in database 104 to indicate lacking desirable recording attributes. In some embodiments, the database entry may include which recording attributes are lacking. The interactive television application may also, in response to this indication, attempt to record another copy of the program with the missing desired attribute. Systems and methods for doing so may be found in commonly-owned U.S. patent application Ser. No. 11/097,556, filed Apr. 1, 2005, which is incorporated by reference herein in its entirety.

In other embodiments, in response to receiving a user instruction to switch to another copy of the program, or in response to the interactive television application determining that a copy lacks desirable recording attributes (e.g., determining that the remaining portion of a copy that is played back lacks desirable recording attributes), the interactive television application may automatically select and play back another copy of the program. For example, the interactive television application may automatically select a copy of the program that has at least one more desirable recording attribute than the original copy. When the interactive television application switches to another copy of a program, the interactive television application may play back the other copy at the beginning of the program. In other embodiments, the interactive television application may instead determine the playback position of the first copy of the program when the "switch" instruction was received or when the interactive television application determined that the first copy of the program lacked desirable recording attributes, and play back of the other copy of the program at, or shortly before, the determined playback position.

The following example will serve to illustrate the switch feature. The interactive television application may determine that a copy of a program is interrupted for 4 minutes at the 21 minute mark because of an emergency announcement that replaced the scheduled broadcast. The interactive television application may identify the interruption by reviewing the program schedule data corresponding to the transmission time and channel of the recorded program (which may have been provided as, for example, program guide data from a data source 24). In response to the determination, the interactive television application may switch to a second copy of the program when the first copy reaches the 21 minute mark. In some embodiments, to ensure that no portion of the program is missed, the interactive television application may start the second copy at a position slightly earlier than the position at which the first copy ended prior to switching (just before the 21 minute mark). After playing past the interruption, the interactive television application may continue to play the second copy, or return to the first and begin playback where the interruption ended, for example depending on user preferences or program defaults regarding which approach provides the best user experience.

As another example of the switch feature, a user may be watching a copy of an hour-long program. At the 44 minute mark, the video quality of the program deteriorates and the user determines that the copy of the program lacks desirable recording attributes. The user then selects the switch feature, and the interactive television application selects, either automatically or in response to a user indication, another copy of the program for playback. The interactive television application plays back the selected copy of the program from the beginning, from a position slightly before that of the first copy when the user initiated the switch feature (i.e., just before the 44 minute mark), or at any other playback position.

Recording multiple copies of programs may cause the storage space available to the interactive television application to diminish rapidly. To make up for the diminution, the interactive television application may automatically delete additional copies of a program after some time (e.g., weeks, months, or once a copy has been played back). In other embodiments, the interactive television application may determine that a copy of a program has desirable recording attributes based on the database entry corresponding to the copy of the program, and delete some or all other copies (whether they lack desirable recording attributes or not). In some embodiments, the interactive television application may delete all copies of a program when the user deletes one of the copies.

In some embodiments, the interactive television application may determine, based on the database entries corresponding to copies of the program, that all of the copies of the program lack desirable recording attributes. In response to such a determination, the interactive television application may combine portions from each copy of the program to create a new copy that does not lack desirable recording attributes. For example, if one copy of the program was interrupted due to a tuner malfunction, the interactive television application may extract the missing portion from another copy of the program, and insert it into the first copy to create a program that is not interrupted.

Figure 11:
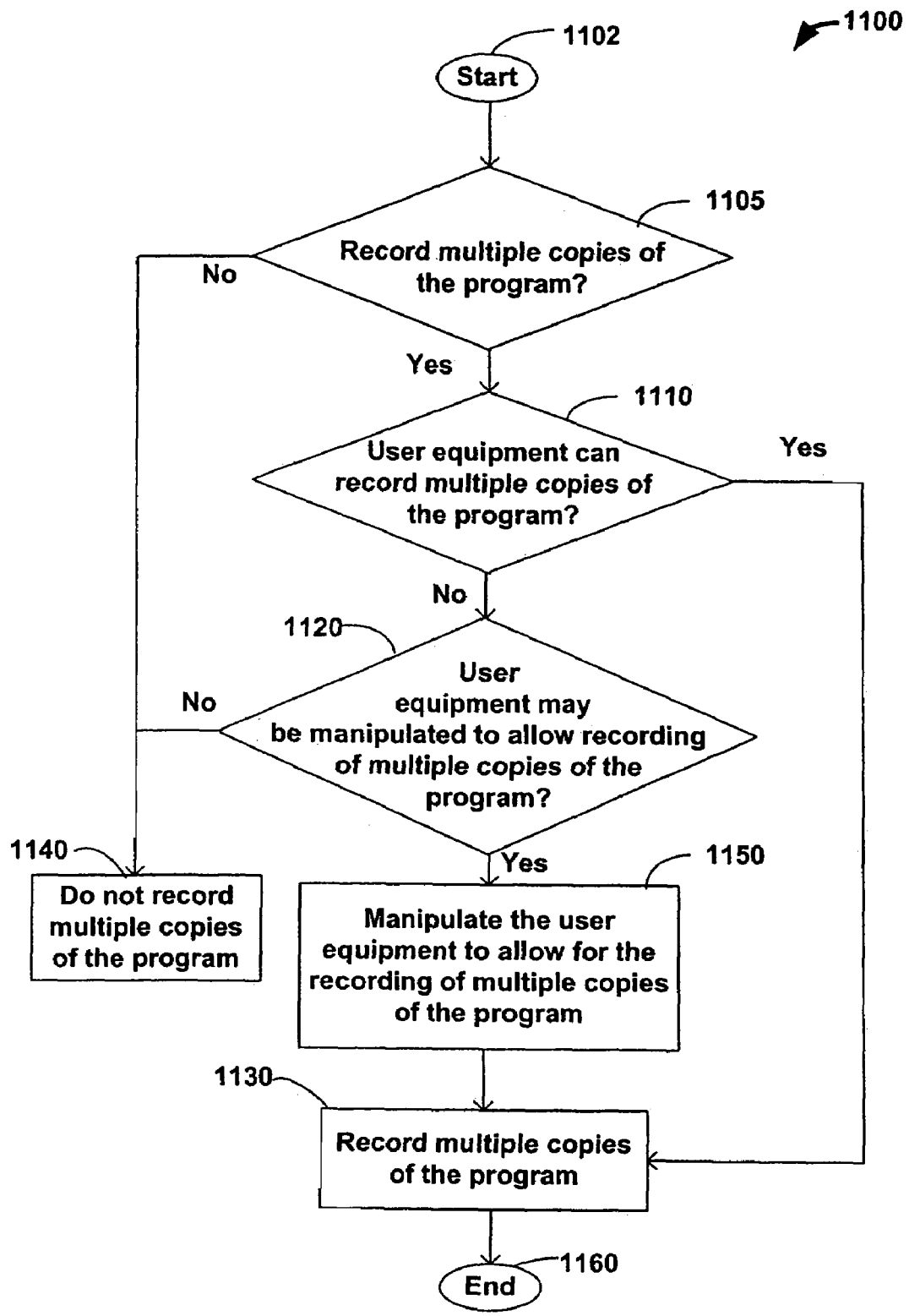
FIG. 11 shows a flow chart of an illustrative process for recording multiple copies of a program in accordance with one embodiment of the present invention.

FIGS. 11-14 are flow charts of illustrative processes involved in some embodiments of this invention. FIG. 11 is a flow chart of an illustrative process for recording multiple copies of a program. Process 1100 begins at step 1102. At step 1105, the interactive television application determines whether to record multiple copies of a program. For example, the interactive television application may determine whether to record multiple copies of the program by default (e.g., when the feature for recording multiple copies of all scheduled programs is enabled). As another example, the interactive television application may receive a user instruction from user input device 16 whether to record multiple copies of a program. In still another example, the interactive television application may determine whether to record multiple copies of the program based on the program's recording priority. If the interactive television application determines that multiple copies should not be recorded, process 1100 moves to step 1140. Otherwise, process 1100 moves to step 1110. At step 1110, the interactive television application determines whether user equipment 10 has the capability to record multiple copies of the program of step 1105. For example, the interactive television application determines whether user equipment 10 will have enough tuners available at the transmission time of the program to record multiple copies, and if recording device 14 or another device will have enough space to record the copies of the program. If the user equipment has the capability to record multiple copies of the program, process 1100 moves to step 1130 where the interactive television application directs recording device 14 or another device to record multiple copies of the program.

If the user equipment does not have the capability to record multiple copies of the program, process 1100 moves to step 1120. At step 1120, the interactive television application determines whether the user equipment 10 can be manipulated to allow the user equipment to record multiple copies of the program. For example, the interactive television application may determine, based on the results of a conflict check, whether a tuner can be freed, or whether recorded programs can be deleted from recording device 14 or another device to make room for storing the copies of the program. The interactive television application may automatically determine whether the user equipment can be manipulated, or prompt the user for instructions to manipulate the user equipment. If the interactive television application determines that the interactive television application cannot manipulate user equipment 10 to record multiple copies, process 1100 moves to step 1140. At step 1140, the interactive television application instructs user equipment 10 not to record multiple copies of the program.

If the interactive television application can manipulate user equipment 10 to record multiple copies, process 1100 moves to step 1150 to do so. For example, the interactive television application may, in response to the determination made in step 1120, cancel a previously scheduled recording to free a tuner, or delete a previously recorded program from recording device 14 or another device to make room to record the copies of the program. Process 1100 then moves to step 1130, where multiple copies of the program are recorded. For example, the interactive television application may schedule each copy with recording options set either automatically or by the user. Process 1100 ends at step 1160.

Figure 12:
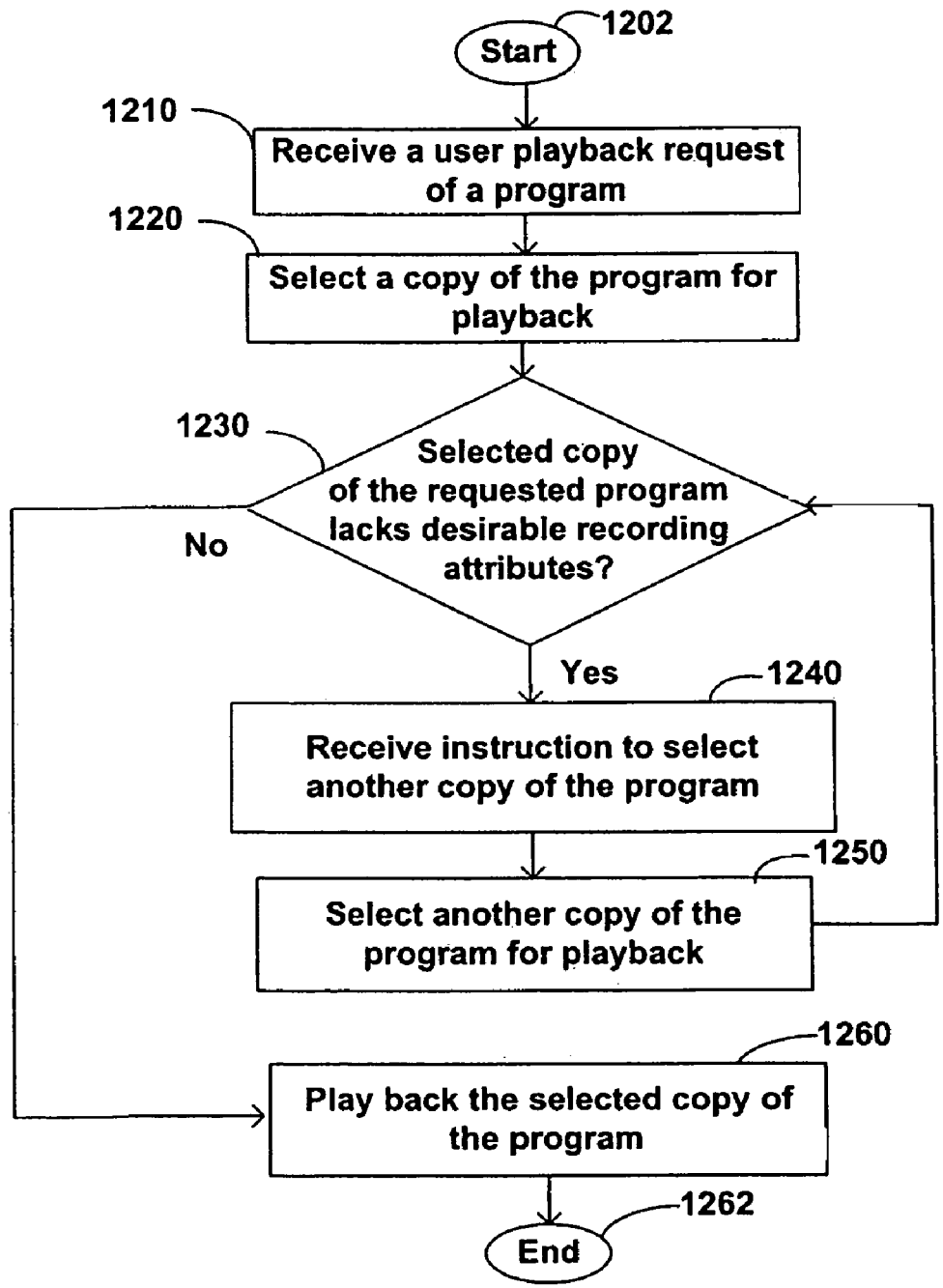
FIG. 12 shows a flow chart of an illustrative process for playing back a copy of a recorded program that does not lack desirable recording attributes in accordance with one embodiment of the present invention.

FIG. 12 is a flow chart of an illustrative process for playing back one of multiple copies of a recorded program. Process 1200 starts at step 1202. At step 1210, the interactive television application receives a user instruction to play back a program. At step 1220, in response to receiving the user instruction, the interactive television application may automatically select a particular copy of the program based on any suitable criteria. In other embodiments, the user may select a particular copy of the program from a list of programs for playback.

At step 1230, the interactive television application determines whether the selected copy of the program lacks desirable recording attributes. For example, the interactive television application may automatically determine whether the selected copy of the program lacks desirable recording attributes. In some embodiments, the interactive television application may identify a database entry corresponding to the selected copy of the program in database 104 indicative of a desirable recording attribute. In another example, the user may determine that the selected copy lacks desirable recording attributes based on an indication of the recording attributes of the selected copy. If the interactive television application determines, either automatically or in response to a user indication, that the program does not lack desirable recording attributes, process 1200 moves to step 1260 and plays back the copy of the program. Process 1200 ends at step 1262.

If the interactive television application determines that the selected copy of the program lacks desirable recording attributes, process 1200 moves to step 1240, where the interactive television application receives an instruction to select another copy of the program. For example, the interactive television application may automatically generate and provide the instruction to recording device 14 or another device, or the interactive television application may receive a user instruction to select another copy of the program. At step 1250, the interactive television application selects another copy of the program. For example, the interactive television application may automatically select another copy of the recorded program based on any suitable criteria, or the interactive television application may receive a user indication of a copy of the recorded program to select. In some embodiments, the interactive television application may select or suggest another copy of the program that has at least one recording attribute that is more desirable than a recording attribute of the first copy. The interactive television application then proceeds back to step 1230 to determine whether the newly selected copy of the program lacks desirable recording attributes.

In some embodiments, the interactive television application may start playing back a selected copy of the program before determining whether the selected and played back copy lacks desirable recording attributes. In such embodiments, the interactive television application may play back the other copy of the program (i.e., selected at step 1250) at any suitable playback position.

Figure 13:
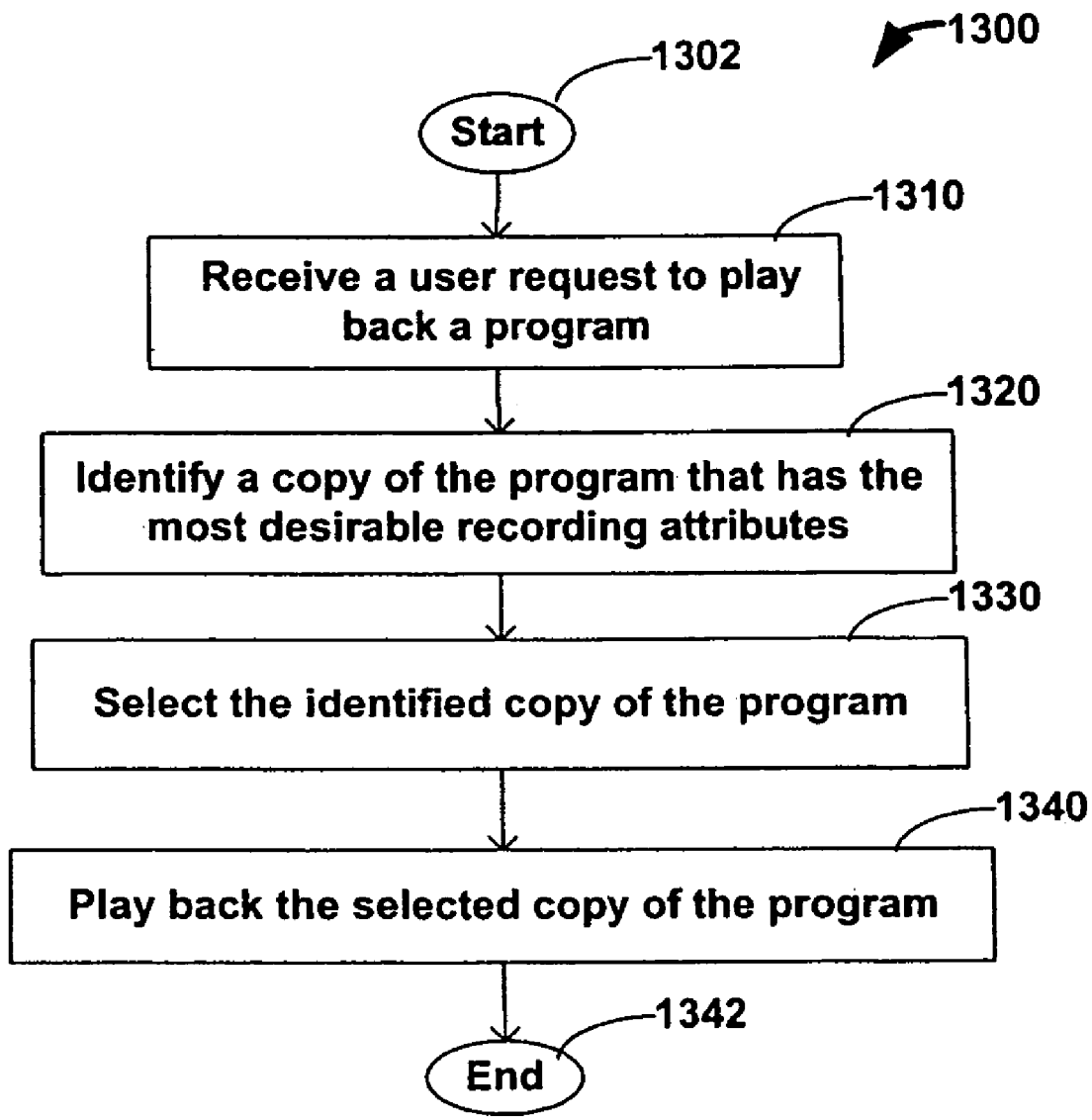
FIG. 13 shows a flow chart of an illustrative process for selecting the best available copy of a program in accordance with one embodiment of the present invention.

FIG. 13 is a flow chart of an illustrative process for selecting the best available copy of a program. Process 1300 begins at step 1302. At step 1310, the interactive television application receives a user request to play back a program. In some embodiments, the interactive television application may receive a request to play back the best available copy of the program. In some embodiments, the interactive television application may automatically play back the best available copy of the program.

At step 1320, the interactive television application identifies the copy of the program that has the most desirable recording attributes. In some embodiments, the interactive television application may identify the copy of the program having the largest number of desirable recording attributes. In some embodiments, the interactive television application may identify the copy of the program having the most desirable recording attributes as measured qualitatively. In some embodiments, the interactive television application may identify a copy of the program that does not lack desirable recording attributes.

At step 1330, the interactive television application selects the copy of the program identified in step 1320 for playback. At step 1340, the interactive television application plays back the selected copy of the program. For example, the interactive television application directs display device 12 to play back the selected copy of the program. Process 1300 ends at step 1342.

Figure 14:
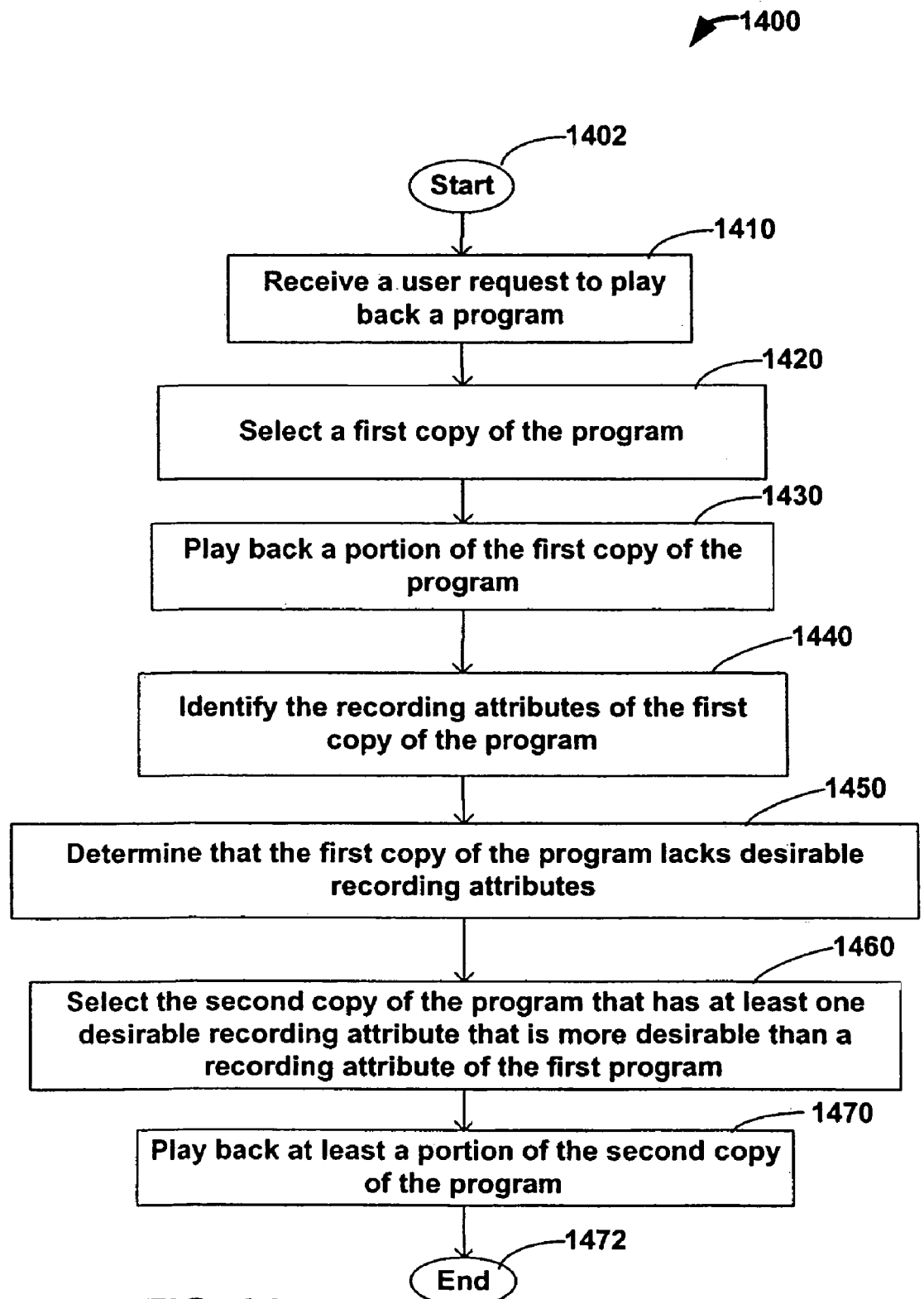
FIG. 14 shows a flow chart of an illustrative process for sequentially playing back portions of copies of the program in accordance with one embodiment of the present invention.

FIG. 14 is a flow chart of an illustrative process for sequentially playing back portions of at least two copies of a program. Process 1400 begins at step 1402. At step 1410, the interactive television application receives a user request to play back a program. At step 1420, the interactive television application selects a first copy of the program. At step 1430, the interactive television application plays back a portion of the selected first copy of the program. For example, the interactive television application directs display device 12 to play back the selected first copy of the program.

At step 1440, the interactive television application identifies the recording attributes of the first copy of the program. In some embodiments, the interactive television application may determine the recording attributes of the first copy of the program using information from database 104. In some embodiments, the user may determine the recording attributes of the first copy of the program based on the characteristics of the program being played back on display device 12. At step 1450, the interactive television application determines that the first copy of the program lacks desirable recording attributes. In some embodiments, the interactive television application automatically determines (e.g., from the attributes retrieved from database 104) that at least one recording attribute of the first copy of the program is not desirable. In some embodiments, the user indicates to the interactive television application that the first copy of the program lacks desirable recording attributes (e.g., using input device 14).

At step 1460, in response to determining to switch to a second copy of the program, the interactive television application selects the second copy of the program that has at least one recording attribute that is more desirable than a recording attribute of the first copy of the program. For example, if the first copy of the program is interrupted, the interactive television application may select a copy of the program that is not interrupted. In some embodiments, the user may select another copy of the program based on an indication provided by the interactive television application of the recording attributes of the other copies of the program. In some cases the user or interactive television application may select another copy that is not known to lack the desirable recording attribute, and may not discover until after playback has begun on the second copy whether the desirable attribute is lacking.

At step 1470, the interactive television application plays back at least a portion of the second copy of the program that was selected at step 1460. In some embodiments, the interactive television application may play back the second copy of the program from the beginning. In some embodiments, the interactive television application may play back the second copy of the program from a playback position just prior to the playback position of the first copy of the program before the interactive television application selected the second copy of the program. Process 1400 ends at step 1472.

It will be noted that all of the features described above in connection with the recording of a transmitted program may be applied to the recording of a video-on-demand program, video clip, series of programs, or any other content suitable for recording and display by user equipment 10. In the case of series, the interactive television application may record multiple copies of one, some, or all episodes of the series.

In some embodiments, copies may be different in ways other than by their recording attributes. For example, two versions of a program may differ because they have different ratings (e.g., an rated-R program shown on HBO and a rated PG-13 program shown on ABC). The programs with different ratings may also, for example, be recorded with different recording attributes. This also may occur with respect to audio services, for example, where one version of a song or music video includes explicit lyrics, while another has been edited to sanitize the language.

The above described embodiments of the present invention are presented for purposes of illustration and not of limitation, and the present invention is limited only by the claims which follow.

What is claimed is:

1. A method for recording and playing back copies of a program with an interactive television application, the method comprising:
   receiving a user request to record a program;
   recording multiple copies of the program at different transmission times in response to the user request to record the program, wherein the multiple copies contain substantially identical program content;
   selecting a first copy of the program from the multiple copies; and
   selecting another copy of the program from the multiple copies, wherein the other copy is different from the first copy.

2. The method of claim 1, wherein the other copy of the program has at least one recording attribute that is more desirable than a recording attribute of the first copy of the program.

3. The method of claim 1, wherein the other copy of the program has all of the recording attributes of a specified set of one or more desirable recording attributes.

4. The method of claim 1, wherein a second set of one or more recording attributes associated with the other copy is preferred over a first set of one or more recording attributes associated with the first copy.

5. The method of claim 1 wherein selecting the other copy of the program comprises automatically determining whether the first copy of the program lacks desirable recording attributes.

6. The method of claim 1 wherein selecting the other copy of the program comprises receiving a user instruction to select another copy of the program.

7. The method of claim 1 further comprising playing back at least a portion of the other copy of the program.

8. The method of claim 7 further comprising:
   playing back a portion of the first copy of the program, wherein:
      selecting another copy of the program comprises identifying the current playback position of the first copy of the program; and
      playing back the at least a portion of the other copy comprises playing back the portion of the other copy of the program starting at or near the identified playback position of the first copy.

9. The method of claim 1 wherein recording multiple copies of the program comprises recording at least one copy of the program in its entirety.

10. The method of claim 1 wherein recording multiple copies of the program comprises recording multiple copies of the program in response to receiving a user instruction to record multiple copies of the program.

11. The method of claim 1 wherein recording multiple copies of the program comprises automatically recording the multiple copies of the program.

12. The method of claim 1 wherein selecting a first copy of the program comprises:
   displaying a listing comprising a list element associated with each of at least two of the multiple copies of the program; and
   receiving a user selection of the list element associated with the first copy of the program.

13. The method of claim 1 wherein selecting a first copy of the program comprises automatically selecting the first copy of the program.

14. A method for recording and playing back copies of a program with an interactive television application, the method comprising:
   receiving a user request to record a program;
   recording multiple copies of the program at different transmission times in response to the user request, wherein the multiple copies contain substantially identical program content;
   receiving a user request to play back the program;
   identifying a copy of the program that has the most desirable recording attributes from the multiple copies; and
   playing back at least a portion of the identified copy of the program.

15. The method of claim 14 wherein the identified copy of the program also does not lack desirable recording attributes.

16. A system for recording and playing back copies of a program, the system comprising a recording device and control circuitry, the control circuitry configured to:
   receive a user request to record a program;
   record multiple copies of the program at different transmission times in response to the user request to record the program, wherein the multiple copies contain substantially identical program content;
   select a first copy of the program from the multiple copies; and
   select another copy of the program from the multiple copies, wherein the other copy of the program is different from the first copy.

17. The system of claim 16, wherein the other copy of the program has at least one recording attribute that is more desirable than a recording attribute of the first copy of the program.

18. The system of claim 16, wherein the other copy of the program has all of the recording attributes of a specified set of one or more desirable recording attributes.

19. The system of claim 16, wherein a second set of one or more recording attributes associated with the other copy is preferred over a first set of one or more recording attributes associated with the first copy.

20. The system of claim 16 wherein the control circuitry is further configured to automatically determine whether the first copy of the program lacks desirable recording attributes.

21. The system of claim 16 wherein the control circuitry is further configured to receive a user instruction to select another copy of the program.

22. The system of claim 16 wherein the control circuitry is further configured to play back at least a portion of the other copy of the program.

23. The system of claim 22 wherein the control circuitry is further configured to:
  play back a portion of the first copy of the program;
  identify the current playback position of the first copy of the program; and
  play back the portion of the other copy of the program starting at or near the identified playback position of the first copy.

24. The system of claim 16 wherein the control circuitry is further configured to record at least one copy of the program in its entirety.

25. The system of claim 16 wherein the control circuitry is further configured to record multiple copies of the program in response to receiving a user instruction to record multiple copies of the program.

26. The system of claim 16 wherein the control circuitry is further configured to automatically record the multiple copies of the program.

27. The system of claim 16 wherein the control circuitry is further configured to:
  output a listing comprising a list element associated with each of at least two of the multiple copies of the program; and
  receive a user selection of the list element associated with the first copy of the program.

28. The system of claim 16 wherein the control circuitry is further configured to automatically select the first copy of the program.

29. A system for recording and playing back copies of a program, the system comprising a recording device for recording programs, an interactive television application and control circuitry, the control circuitry and interactive television application configured to:
  receive a user request to record a program;
  direct the recording device to record multiple copies of the program at different transmission times in response to the user request, wherein the multiple copies contain substantially identical program content;
  receive a user request to play back the program;
  identify a copy of the program that has a preferred set of one or more desirable recording attributes from the multiple copies; and
  play back at least a portion of the identified copy of the program.

* * * * *

UNITED STATES PATENT AND TRADEMARK OFFICE
CERTIFICATE OF CORRECTION

PATENT NO.       : 7,646,962 B1                         Page 1 of 1
APPLICATION NO. : 11/241523
DATED            : January 12, 2010
INVENTOR(S)      : Ellis et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 953 days.

Signed and Sealed this

Sixteenth Day of November, 2010

David J. Kappos
*Director of the United States Patent and Trademark Office*